United States Patent
Mori et al.

(10) Patent No.: US 6,901,128 B2
(45) Date of Patent: May 31, 2005

(54) FOREIGN MATTER FILTER FOR FUEL ASSEMBLY IN PRESSURIZED WATER REACTOR

(75) Inventors: Masaji Mori, Hyogo-ken (JP); Juntaro Shimizu, Hyogo-ken (JP); Kazuki Monaka, Hyogo-ken (JP); Takashi Shimomura, Hyogo-ken (JP); Kimio Nakayama, Ibaraki-ken (JP); Toshifumi Naito, Hyogo-ken (JP)

(73) Assignees: Mitsubishi Heavy Industries, Ltd., Tokyo (JP); Mitsubishi Nuclear Fuel Co., Ltd., Naka-gun (JP)

( * ) Notice: Subject to any disclaimer, the term of this patent is extended or adjusted under 35 U.S.C. 154(b) by 42 days.

(21) Appl. No.: 10/199,104

(22) Filed: Jul. 22, 2002

(65) Prior Publication Data

US 2003/0043954 A1 Mar. 6, 2003

(30) Foreign Application Priority Data

Aug. 15, 2001 (JP) ........................................ 2001-246364

(51) Int. Cl.⁷ ................................................ G21C 1/04
(52) U.S. Cl. ........................ 376/310; 376/309; 376/352; 376/438; 376/462
(58) Field of Search ................................. 376/309, 310, 376/352, 438, 462

(56) References Cited

U.S. PATENT DOCUMENTS

| | | | |
|---|---|---|---|
| 4,684,496 A | | 8/1987 | Wilson et al. |
| 5,030,412 A | * | 7/1991 | Yates et al. .................. 376/352 |
| 5,225,152 A | * | 7/1993 | Verdier ........................ 376/352 |
| 5,230,861 A | * | 7/1993 | Nylund ........................ 376/439 |
| 5,361,287 A | * | 11/1994 | Williamson .................. 376/352 |
| 5,473,649 A | * | 12/1995 | Olsson et al. ................ 376/313 |
| 5,867,551 A | * | 2/1999 | Toshihiko .................... 376/352 |

FOREIGN PATENT DOCUMENTS

| | | |
|---|---|---|
| JP | 62-90594 | 4/1987 |
| JP | 63-285490 | 11/1988 |
| JP | 09-068585 | 3/1997 |

* cited by examiner

*Primary Examiner*—Jack Keith
(74) *Attorney, Agent, or Firm*—Oblon, Spivak, McClelland, Maier & Neustadt, P.C.

(57) ABSTRACT

A foreign matter filter provided between a DFBN and a lower grid has two adjacent thin straps assembled into a lattice. The straps are equipped on the front and back sides with axially continuous protrusions.

9 Claims, 22 Drawing Sheets

(FUEL ROD CELL) (THIMBLE CELL)
7

(FUEL ROD CELL) (THIMBLE CELL)
12

(FUEL ROD CELL) (THIMBLE CELL)
14

(FUEL ROD CELL) (THIMBLE CELL)
14

(FUEL ROD CELL) (THIMBLE CELL)
14

37
36 FOREIGN MATTER FILTER
5 FUEL ROD

LOWER GRID
5 FUEL ROD
37
36 FOREIGN MATTER FILTER

2 LOWER NOZZLE

51 FOREIGN MATTER FILTER
5 FUEL ROD

LOWER GRID
5 FUEL ROD
52
51 FOREIGN MATTER FILTER

2 LOWER NOZZLE 2 (LOWER NOZZLE)

6 (FLOW PASSAGE HOLE)

6

FOREIGN MATTER FILTER FOR FUEL ASSEMBLY IN PRESSURIZED WATER REACTOR

BACKGROUND OF THE INVENTION

1. Field of the Invention

The present invention relates to a fuel assembly in a pressurized water reactor, and in particular, to a foreign matter filter serving as a protection means against foreign matter for preventing intrusion of foreign matter into a fuel effective portion in a coolant.

2. Description of the Related Art

FIG. 25 is a perspective view drawing showing a fuel assembly generally used in a pressurized water reactor. FIG. 26 is a sectional view showing a typical nuclear reactor.

A fuel assembly is composed of an upper nozzle 1 and a lower nozzle 2 which are spaced apart from each other, a plurality of grids 3 being spaced at a predetermined interval and having lattice spaces formed by straps, control rod guide pipes (guide thimbles) 4 inserted into the lattice spaces at a predetermined interval, fastened by fastening portions of the grids 3, and having upper and lower end portions respectively connected to the upper nozzle 1 and the lower nozzle 2, and a large number of fuel rods 5 elastically supported by support portions of the grids 3. In the fuel rods 5, fuel pellets and springs are hermetically sealed by covering tubes and upper and lower end taps. A tubular insert 10 with an end tap is connected to the lowermost grid, and the guide thimbles 4 are inserted into the insert, with the guide thimbles 4 and the lower nozzle 2 being connected to each other. The portions of the lattice spaces at the positions of the guide thimbles are referred to as thimble cells, and the portions of the lattice spaces at the positions of the fuel rods are referred to as fuel rod cells.

The nozzle 2 is arranged directly above an opening in the lower portion of the nuclear reactor, coolant flowing from here to the portion of the reactor above the reactor core. In view of this, the lower nozzle 2 has, as shown in FIGS. 27A and 27B, a large number of flow passage holes 6 for allowing the coolant to pass through.

During production, installation, and repair of piping and cooling equipment, various kinds of foreign matter including splits and fragments, such as metal particles, chips, and shavings, can get into the coolant, and it is to be assumed that these fragments of foreign matter are held between the walls in the cells of the grids 3 and the fuel rods 5 after flowing into the interior of the fuel assembly. Movement and vibration of the held foreign matter due to the coolant flow lead to abrasion of the fuel rods 5 and removal of the covering tubes (piercing of the covering tubes). This leads to harmful effects, such as corrosion of the fuel rods 5 and the impossibility of retaining radioactive fission gas products in the fuel rods 5 (fuel leakage).

To solve this problem, there is adopted, as a first prevention means against foreign matter, an anti-foreign-matter lower nozzle (hereinafter referred to as DFBN) to minimize the amount of fragments of foreign matter in the coolant flowing into the fuel assembly, reducing the diameter of the flow passage holes through which the coolant flows, and further, as a second prevention means, an elongated solid lower end tap is put in the lowermost grid, utilizing the gap between the lowermost grid and the elongated fuel rod lower end tap portion. That is, it is assumed that foreign matter having passed through the lowermost grid constituting the second prevention means, also passes through the grid situated on the downstream side, and does not bring about fuel leakage.

However, from now on, the fuel assembly will be improved toward higher burn-up, and, with that, the internal pressure of the fuel rods will become severer, so that it is desirable that the fuel rod lower end taps be shortened in order to restrain the internal pressure, thereby increasing the plenum volume.

As a result of irradiation growth of the fuel rods, the fuel rods are displaced downwardly, so that the covering tubes get out of the lowermost grid; thus, the shortening of the fuel rod lower end taps involves a problem in that the trapping of foreign matter fragments by the gap between the fuel rod lower end tap portions (solid portions) and the lowermost grid, which is the second anti-foreign-matter means, cannot be sustained over the entire service life of the fuel assembly.

SUMMARY OF THE INVENTION

It is an object of the present invention to provide a foreign matter filter in which the foreign matter trapping effect can be expected over the entire service life of the fuel assembly even in the case of a design in which the fuel rod lower end taps are shortened.

In order to achieve the above-mentioned object, there is provided a foreign matter filter provided between a DFBN and a lower grid in a nuclear reactor, characterized in that two adjacent thin straps are assembled into a lattice-like form.

DETAILED DESCRIPTION OF THE PREFERRED EMBODIMENTS

Embodiment 1

Figure 1:
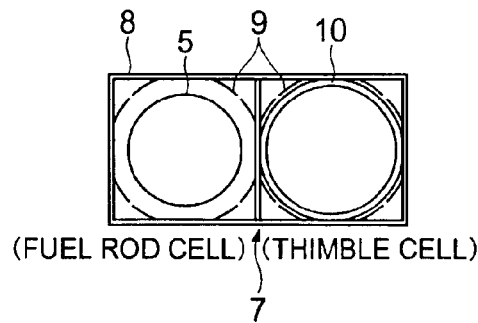
FIG. 1 is an enlarged view of a fuel rod cell and a thimble cell of a foreign matter filter according to Embodiment 1.
Figure 10:
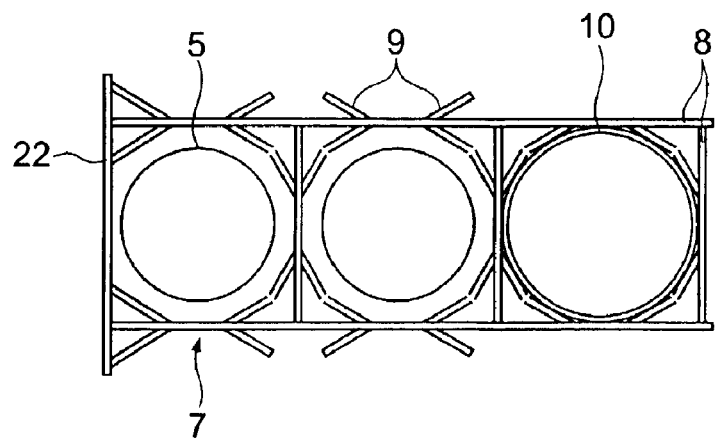
FIG. 10 is an enlarged view of a fuel rod cell and a thimble cell of a foreign matter filter according to Embodiments 1 and 6.

FIGS. 1 and 10 show a fuel rod cell and a thimble cell of a foreign matter filter according to Embodiment 1; by providing a foreign matter filter composed of a plurality of such cells between a DFBN and the lower grid, flowing of foreign matter fragments can be prevented into a fuel effective portion (covering tube portion) over the entire service life of a fuel assembly.

Between a DFBN 2 and a lower grid 3, there is provided a foreign matter filter 7 according to the present invention having lattice spaces formed by straps. FIGS. 1 and 10 are enlarged views of a fuel rod cell and a thimble cell of a foreign matter filter according to Embodiment 1. Protrusions 9 of FIG. 1 are rounded, whereas protrusions 9 of FIG. 10 are made flat in consideration of machinability. The configurations of the protrusions are not restricted to the ones shown in these drawings.

The foreign matter filter 7 is formed by straps characterized in that axially continuous protrusions 9 are provided on the front and back sides and that foreign matter smaller (approximately ½) than the foreign matter trapped by the grid portion on the downstream side can be captured, whereby it is possible to capture foreign matter with this foreign matter filter portion before the foreign matter is tapped by the grid lower end situated in the covering tube portion. The outer size of the foreign matter filter 7 is somewhat smaller than that of the DFBN 2 and the lower grid 3. As will be described below, with this construction, the outer strap of the foreign matter filter can be of a flat and simple configuration that is easy to produce. Further, by making the outer size of the foreign matter filter 7 small, it is possible to eliminate the potential factor of damage to the foreign matter filter due to interference with an adjacent fuel assembly when handling the fuel assembly.

Regarding the construction of the filter, axially continuous protrusions 9 are provided in the inner straps 8 in the vicinity of the intersections of the straps formed as lattices (At each strap intersection, protrusions are provided on the front and back sides by two straps). The axial length of the protrusions 9 is determined in consideration of the irradiation growth (downward expansion) of the fuel rods 5. That is, in order that the foreign matter trap dimension defined by a fuel rod lower end tap (lower end position) and the foreign matter filter may be constant, the continuous protrusions 9 are within the wide height range of the inner straps 8.

In the present invention, two thin inner straps 8 are superimposed one upon the other, and continuous, wide-range protrusions 9 are provided axially and on the front and back sides in the vicinity of a strap intersection. Two inner straps 8 are superimposed one upon the other for the purpose of providing axially wide-ranged continuous protrusions 9 on the front and back sides in the vicinity of a strap intersection. Apart from this, the restraining of an increase in pressure loss and the dimensional restriction at the thimble (dimensional inter-face due to the existence of the insert 10) are taken into account. The configuration of the protrusions is determined taking into account the moldability of the straps and the regular flow of the cooling water. When the protrusions are formed without providing any slots in the height (axial) direction in the vicinity of the strap intersection (in the vicinity of a slit 23 for combining straps perpendicular to each other), the residual distortion is large, and the strap moldability deteriorates. In view of this, as shown in FIGS. 6A through 6E, a (cantilever-like) configuration is adopted in which slots 11 for forming the protrusions are provided in the height direction on the strap intersection side. It is also possible, as shown in FIGS. 7A through 7C, to perform lancing as indicated at 26. Further, it is also possible to perform lancing with not only the axial slots but also the lateral slots eliminated. The protrusions are formed in a regular configuration by means of each lattice (cell).

As described above, to enhance the foreign matter trapping performance over the entire service life of the fuel assembly, the foreign matter filter of the present invention formed by straps having axially continuous protrusions allows the maximum gap between the foreign filter straps and the lower end taps to be smaller than the grid portion (approximately ½) even in the case of a design in which the fuel rod lower end taps are shortened, whereby it is possible to minimize intrusion into the fuel effective portion of such foreign matter fragments as will lead to fuel leakage.

In the construction of the foreign matter filter of the present invention, a foreign matter trapping effect can be expected over the entire service life of the fuel assembly even in the case of a design in which the fuel rod lower end taps are shortened.

Embodiment 2

Figure 2:
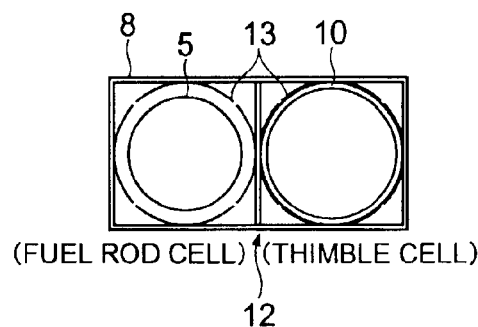
FIG. 2 is an enlarged view of a fuel rod cell and a thimble cell of a foreign matter filter according to Embodiment 2.

FIG. 2 shows a fuel rod cell and a thimble cell of a foreign matter filter according to Embodiment 2. As in Embodiment 1, by providing a foreign matter filter composed of a plurality of such cells between the DFBN and the lower grid, foreign matter fragments are prevented from flowing into the fuel effective portion over the entire service life of the fuel assembly.

To achieve the above object, in accordance with the present invention, the following means is adopted for the purpose of preventing, over the entire service life of the fuel assembly, such foreign matter fragments in the coolant as will lead to fuel leakage from getting into the flow passage holes of the DFBN and flowing into the fuel effective portion.

Between the DFBN 2 and the lower grid 3, there is provided a foreign matter filter 12 of the present invention having lattice spaces defined by straps. The basic construction of the foreign matter filter 12 of Embodiment 2 is similar to that of Embodiment 1. (FIG. 2 is an enlarged view of a fuel rod cell and a thimble cell of a foreign matter filter according to Embodiment 2. The configuration of the protrusions is not restricted to the one shown.) While in Embodiment 1 the protrusions of the foreign matter filter are spaced apart from the insert, Embodiment 2 is characterized in that the protrusions 13 are provided along the outer surface (contour) of the insert 10. With this construction, the wetted perimeter area of the coolant in the foreign matter filter portion is reduced. Further, restraining of an increase in pressure loss is to be expected. Also in the case in which this foreign matter filter is provided, the same anti-foreign-matter effect (foreign matter trapping property) as that of Embodiment 1 is to be expected.

Embodiment 3

Figure 3A:
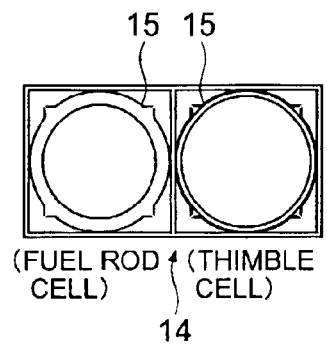
FIGS. 3A, 3B, and 3C are enlarged views each showing a fuel rod cell and a thimble cell of a foreign matter filter according to Embodiment 3.
Figure 3B:
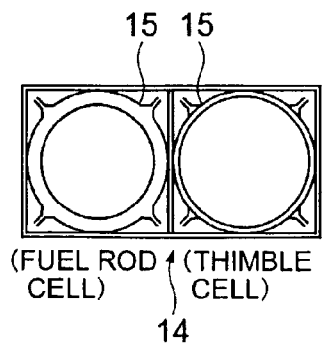
Figure 3C:
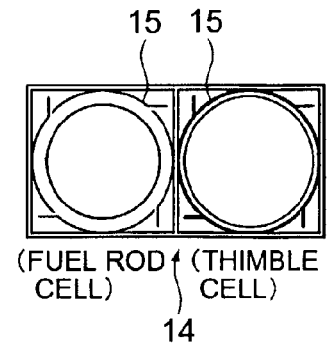

FIGS. 3A through 3C show a fuel rod cell and a thimble cell of a foreign matter filter according to Embodiment 3; by providing a foreign matter filter composed of a plurality of such cells between the DFBN and the lower grid, foreign matter fragments are prevented from flowing into the fuel effective portion over the entire service life of the fuel assembly.

To achieve the above object, the present invention adopts the following means to prevent, over the entire service life of the fuel assembly, such foreign matter fragments in the coolant as will lead to fuel leakage from getting into the flow passage holes of the DFBN and flowing into the fuel effective portion.

Between the DFBN 2 and the lower grid 3, there is provided a foreign matter filter 14 according to the present invention having lattice spaces formed by straps. The foreign matter filter 14 of Embodiment 3 is basically the same as those of Embodiments 1 and 2 except that the configuration of the protrusions 15 is different from those of Embodiments 1 and 2. (FIG. 3 is an enlarged view of a fuel rod cell and a thimble cell of a foreign matter filter according to Embodiment 3. The configuration of the protrusions is not restricted to the one shown.) The foreign matter filter 14 of Embodiment 3 is characterized in that it can capture foreign matter fragments smaller than those to be captured by the foreign matter filters of Embodiments 1 and 2, and that a foreign matter prevention effect (foreign matter trapping effect) superior to those of Embodiments 1 and 2 is to be expected.

Embodiment 4

Figure 4A:
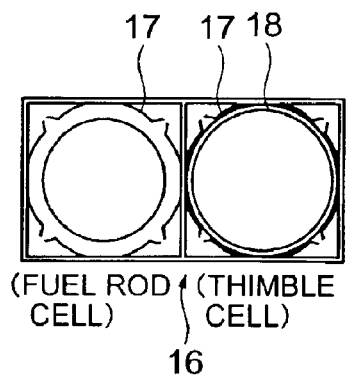
FIGS. 4A, 4B, and 4C are enlarged views each showing a fuel rod cell and a thimble cell of a foreign matter filter according to Embodiment 4.
Figure 4B:
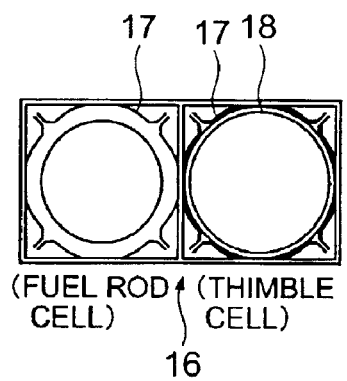
Figure 4C:
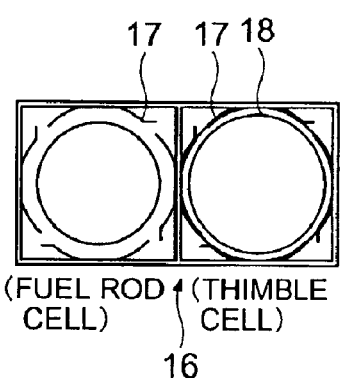

FIGS. 4A through 4C show a fuel rod cell and a thimble cell of a foreign matter filter according to Embodiment 4; by providing a foreign matter filter composed of a plurality of such cells between the DFBN and the lower grid, foreign matter fragments are prevented from flowing into the fuel effective portion over the entire service life of the fuel assembly.

To achieve the above object, the present invention adopts the following means to prevent, over the entire service life of the fuel assembly, such foreign matter fragments in the coolant as will lead to fuel leakage from getting into the flow passage holes of the DFBN and flowing into the fuel effective portion.

Between the DFBN 2 and the lower grid 3, there is provided a foreign matter filter according to the present invention having lattice spaces formed by straps. The basic construction of the foreign matter filter 16 of Embodiment 4 is similar to that of Embodiment 3. (FIG. 4 is an enlarged view of a fuel rod cell and a thimble cell of a foreign matter filter according to Embodiment 4. The configuration of the protrusions is not restricted to the one shown.) While in Embodiment 3 the contour of the foreign matter filter protrusions and the contour of the fuel rod or the insert are concentric (The center of the contour of the protrusions corresponds to the center of the fuel rod or the insert), Embodiment 4 does not adopt such a concentric configuration; at the thimble cell position, the forward ends of the protrusions 17 interfere with (overlap) the insert 10. The foreign matter filter 16 of Embodiment 4 provides a foreign matter intrusion prevention effect (foreign matter trapping property) equal to or higher than that of Embodiment 3. It is to be assumed that the axial positioning of the foreign matter filter is generally effected by connecting the insert and the inner straps of the foreign matter filter by spot welding as in the case of the grid portion; when the foreign matter filter 16 of Embodiment 4 of the present invention is adopted, by providing a cutout or the like in the outer surface of the insert 18, it is possible to fit in the forward end portions of the protrusions 17 of the foreign matter filter 16 for mechanical connection. Further, since the protrusions are of a cantilever-like configuration, the protrusions can extend along the outer surface (contour) of the insert without providing a cutout or the like in the insert. (The connection of the foreign matter filter straps and the insert may also be effected by spot welding.)

Embodiment 5

FIGS. 5A and 5B and FIGS. 11A and 11B show a fuel rod cell and a thimble cell of a foreign matter filter according to Embodiment 5; by providing a foreign matter filter composed of a plurality of such cells between the DFBN and the lower grid, foreign matter fragments are prevented from flowing into the fuel effective portion over the entire service life of the fuel assembly.

To achieve the above object, the present invention adopts the following means to prevent, over the entire service life of the fuel assembly, such foreign matter fragments in the coolant as will lead to fuel leakage from getting into the flow passage holes of the DFBN and flowing into the fuel effective portion.

Figure 5A:
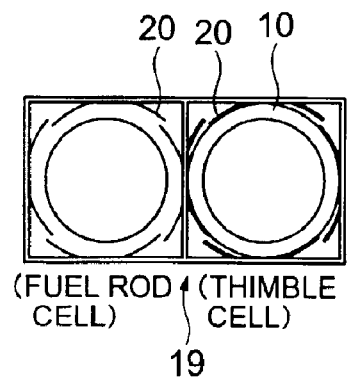
FIGS. 5A and 5B are enlarged views each showing a fuel rod cell and a thimble cell of a foreign matter filter according to Embodiment 5.
Figure 5B:
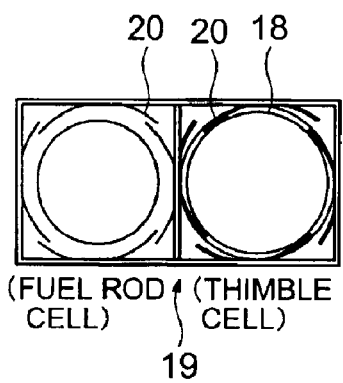
Figure 11A:
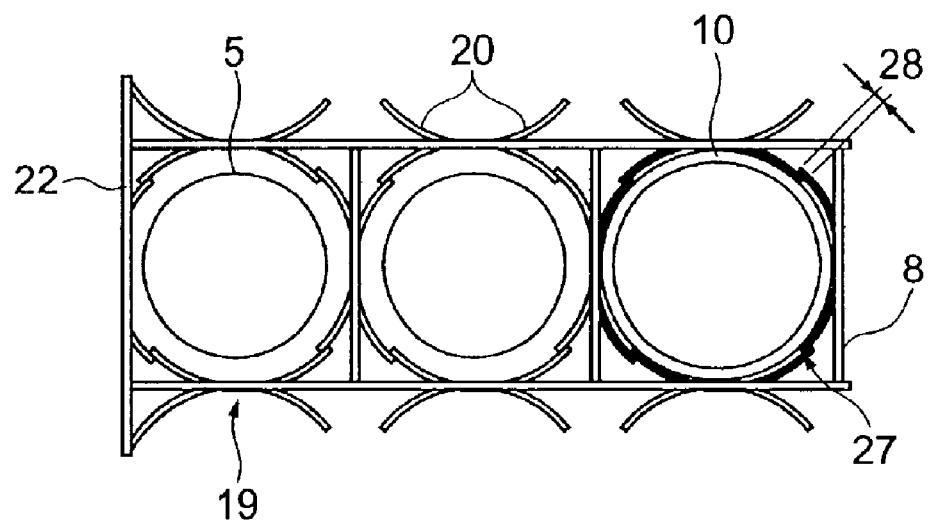
FIGS. 11A and 11B are diagrams respectively showing the constructions of foreign matter filters according to Embodiments 2 and 6.
Figure 11B:
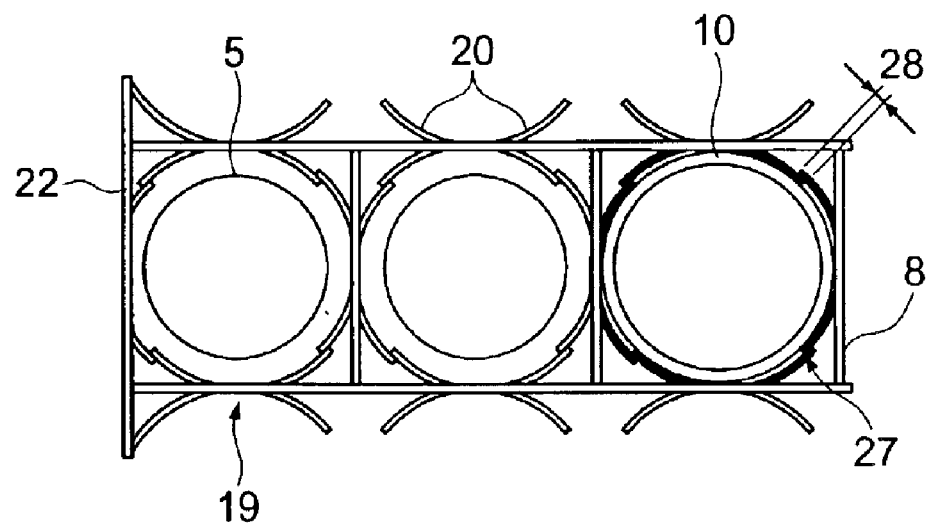

Between the DFBN 2 and the lower grid 3, there is provided a foreign matter filter 19 according to the present invention having lattice spaces formed by straps. The basic construction of the foreign matter filter of Embodiment 5 is similar to that of Embodiment 1. (FIG. 5 is an enlarged view of a fuel rod cell and a thimble cell of a foreign matter filter according to Embodiment 5. The configuration of the protrusions is not restricted to the one shown.) Assuming that there is an interface of 45 degrees in the corner portion of a cell, the configuration of the protrusions of the foreign matter filter is symmetrical with respect to the interface of 45 degrees (concentric and of the same curved shape) in Embodiment 1, whereas, in Embodiment 5, the right and left protrusions 20 are asymmetrical. As in Embodiment 1, in FIG. 5A, the contour of the foreign matter filter protrusions and the contour of the fuel rod 5 or the insert 10 are concentric (Although the size of the rounded portions of the protrusions differs, the center of the rounded portion corresponds to the center of the fuel rod or the insert), whereas, in FIG. 5B, a concentric configuration is not adopted as in Embodiment 4, and, at the thimble cell position, the forward ends of the protrusions 20 interfere with (overlap) the insert 18. FIGS. 11A and 11B show a foreign matter filter construction in which, when vibration of the cantilever-like protrusions 20 is a problem according to the condition of use (flowing), the forward ends of the protrusions 20 are connected by welding as indicated at 27 in order to restrain the vibration. The constructions of FIGS. 11A and 11B differ in the overlapping amount 28 due to the forward ends of the protrusions 20; in FIG. 11B, the overlapping amount 28 is increased. To increase the overlapping amount 28, a side configuration as shown in FIG. 7C is imparted to the protrusions 20. (The specific configuration is not restricted thereto.) Regarding FIGS. 11A and 11B, taking into account the temporal assembly property (to improve the temporal assembly property), it is possible for the cantilever-like protrusions 20 situated on the inner side to be molded in a condition in which they are drawn up toward the cell (fuel rod) center side beforehand, a pin or the like being fitted into the cell at the time of the welding of the forward ends of the protrusions, and the welding being performed with the inner protrusions being held in contact with the outer protrusions. It is expected that the foreign matter filter of Embodiment 5 provides a foreign matter prevention effect (foreign matter trapping property) equivalent to that of Embodiment 1.

Embodiment 6

FIGS. 6A through 6E and 7A through 7C show the inner strap side configurations of a foreign matter filter according to Embodiment 6 (enlarged view of the representative cell); by appropriately combining these side configurations with the sectional configurations (in plan view) of Embodiments 1 through 5, a foreign filter configuration and a combination pattern are obtained which prevent, over the entire service life of the fuel assembly, such foreign matter fragments as will lead to fuel leakage from flowing into the fuel effective portion. FIGS. 8 through 11B show the outer strap structure of the foreign matter filter (enlarged view of the representative cell) in connection with the relationship with the inner strap (e.g., a combination of Embodiment 1 and Embodiment 5).

To prevent, over the entire service life of the fuel assembly, such foreign matter fragments in the coolant as will lead to fuel leakage from entering the flow passage holes of the DFBN and flowing into the fuel effective portion, the foreign matter filter 21 is provided with axially continuous protrusions 24.

FIGS. 6A through 6E and 7A through 7C show the inner strap side configurations of the foreign matter filter 21. (The specific configurations of the protrusions, slots, etc. are not restricted to the ones shown.) The outer size of the foreign matter filter is somewhat smaller than those of the DFBN2 and the lower grid 3. The following are patterns in which these inner strap side configurations are combined with the sectional configurations (in plan view) of Embodiments 1 through 5.

TABLE

Figures 6A, 6B, 6C:
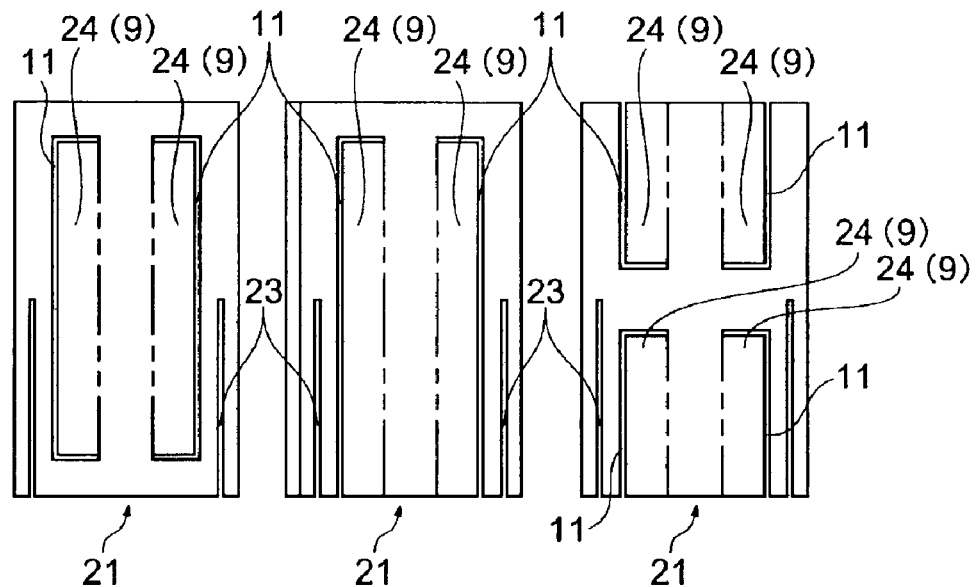
FIGS. 6A, 6B, 6C, 6D, and 6E are diagrams each showing the side configuration of an inner strap of a foreign matter filter according to Embodiment 6.
Figures 6D, 6E:
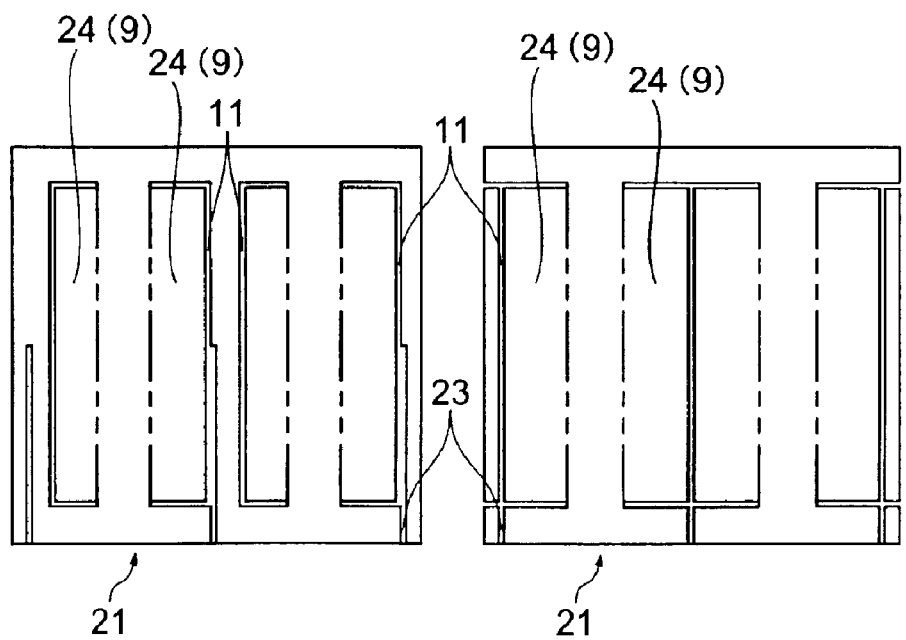
Figure 7A:
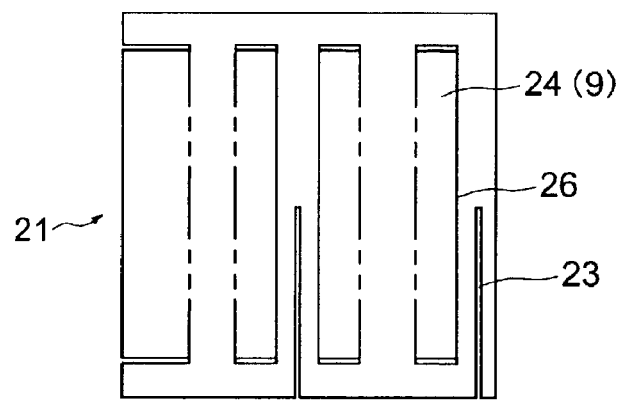
FIGS. 7A, 7B, and 7C are diagrams each showing the side configuration of an inner strap of a foreign matter filter according to Embodiment 6.
Figure 7B:
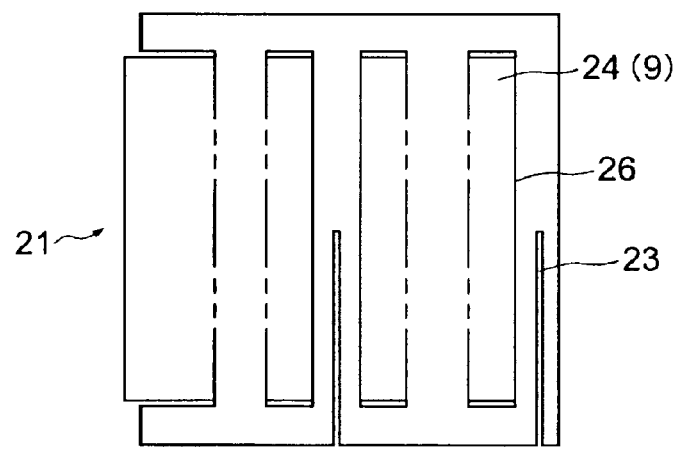
Figure 7C:
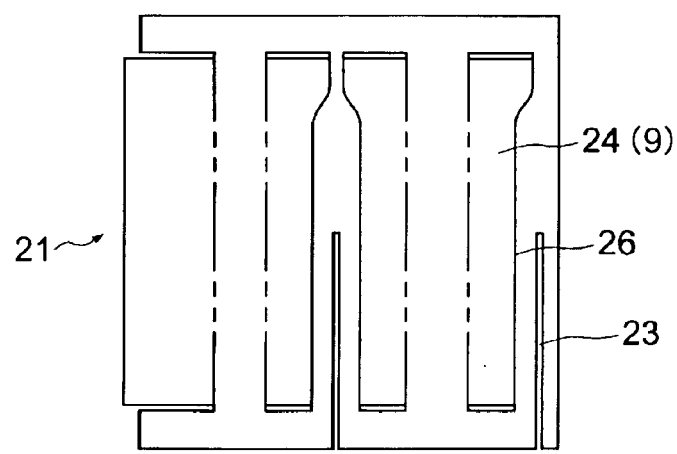

| | | Inner strap side configuration | | | | | |
|---|---|---|---|---|---|---|---|
| | | FIG. 6A FIG. 7A, B | FIG. 6B | FIG. 6C | FIG. 6D | FIG. 6E | FIG. 7C |
| Section structure (in plan view) | FIG. 1, 10 | ○ | ○ | ○ | . | ○ | — |
| | FIG. 2 | ○ | ○ | ○ | . | ○ | — |
| | FIG. 3A | ○ | ○ | ○ | . | ○ | — |
| | FIG. 3B | — | — | — | ○ | ○ | — |
| | FIG. 3C | . | . | . | ○ | . | — |
| | FIG. 4A | ○ | ○ | ○ | . | ○ | — |
| | FIG. 4B | — | — | — | — | ○ | — |
| | FIG. 4C | . | . | . | ○ | . | — |
| | FIG. 5A | ○ | ○ | ○ | . | ○ | — |
| | FIG. 5B | . | . | . | ○ | . | — |
| | FIG. 11A | ○ | ○ | ○ | ○ | ○ | — |
| | FIG. 11B | — | — | — | — | — | ○ |

Symbol ○ indicates recommended combination patterns.
Symbol . indicates patterns which, if not recommended, can be adopted.

By making the outer size of the foreign matter filter small, it is possible to obtain a flat and simple outer strap configuration 22 as long as it is a combination with the inner strap sectional configurations (in plan view) of Embodiments 1 through 5.

Figure 8:
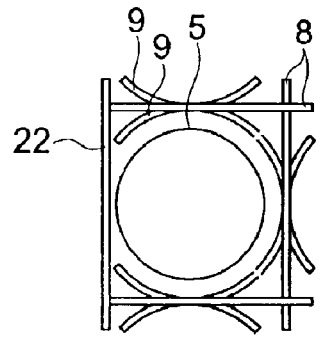
FIG. 8 is an enlarged view of a fuel rod cell of a foreign matter filter according to Embodiment 6.
Figures 9A, 9B:
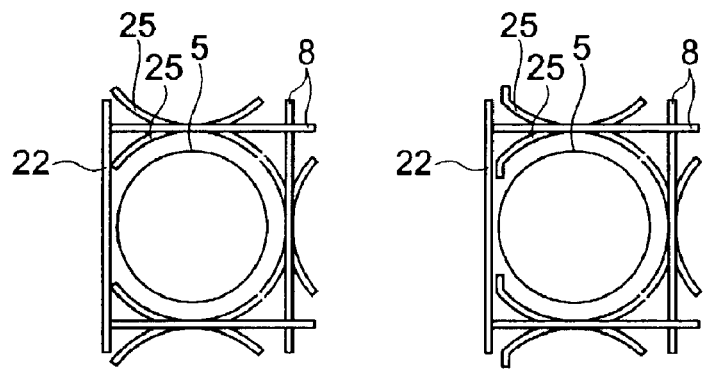
FIGS. 9A and 9B are enlarged views each showing a fuel rod cell of a foreign matter filter according to Embodiment 6.

Further, of the cells in the outermost periphery, to capture smaller foreign matter fragments with the gap between the outer strap 22 and the fuel rod 5, it is also possible, as shown in FIGS. 9A through 11B, to change the length and configuration of solely the protrusions 25 situated at both ends of the inner strap 8 from those shown in FIG. 8. (The specific configuration of the protrusions is not restricted to the one shown.) FIGS. 8 through 11B show the outer strap structure of the foreign matter filter (enlarged view of the representative cell) in connection with the inner strap (e.g., a combination of Embodiment 1 and Embodiment 5). In the foreign matter filter of the present invention constructed through the above combination, it is possible to make the maximum gap of the outer strap of the foreign matter filter and the lower end tap smaller than the lower grid portion even in the case of a design in which the fuel rod lower end taps are shortened, whereby it is possible to minimize the intrusion into the fuel effective portion of such foreign matter fragments as will lead to fuel leakage.

By installing this foreign matter filter, an advanced foreign matter prevention effect (trapping property for smaller foreign matter fragments and durability in foreign matter trapping over the entire service life of the fuel assembly) is to be expected.

Embodiment 7

Figure 12A:
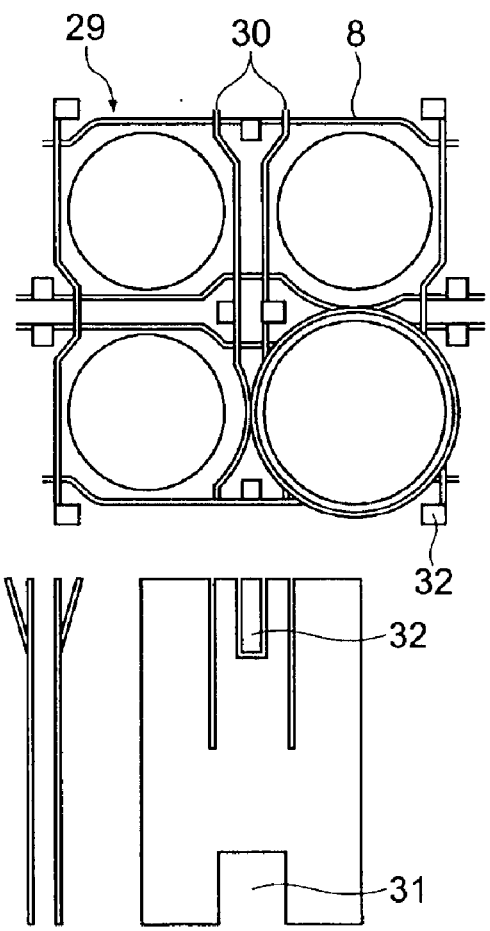
FIGS. 12A and 12B are enlarged views each showing a fuel rod cell and a thimble cell of a foreign matter filter according to Embodiment 7.
Figure 12B:
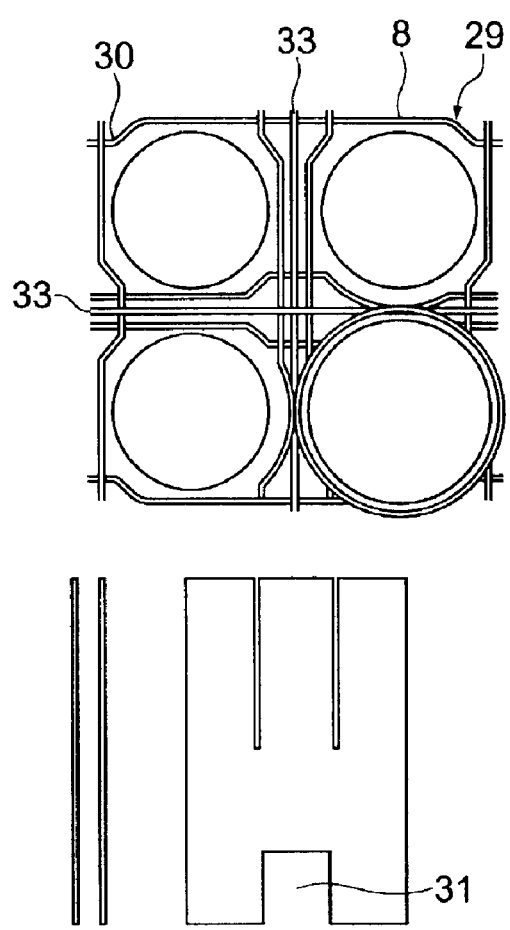

FIGS. 12A and 12B show a fuel rod cell and a thimble cell of a foreign matter filter according to Embodiment 7; by providing a foreign matter filter composed of a plurality of such cells between the DFBN and the lower grid, foreign matter fragments are prevented from flowing into the fuel effective portion over the entire service life of the fuel assembly.

To achieve the above object, the present invention adopts the following means to prevent, over the entire service life of the fuel assembly, such foreign matter fragments in the coolant as will lead to fuel leakage from getting into the flow passage holes of the DFBN and flowing into the fuel effective portion.

Between the DFBN 2 and the lower grid 3, there is provided a foreign matter filter 29 according to the present invention having lattice spaces formed by straps. (FIGS. 12A and 12B is an enlarged view of a fuel rod cell and a thimble cell of a foreign matter filter according to Embodiment 7. The specific configuration of the protrusions is not restricted to the one shown.) The construction adopted is one in which axially continuous protrusions 30 are provided in each inner strap 8 at each intersection of the straps formed into a lattice (Protrusions are provided on the front and back sides by two straps at each strap intersection). The axial length of the protrusions 30 is determined taking into account the irradiation growth (downward expansion) of the fuel rod 5. That is, in order that the foreign matter trapping dimension defined by the fuel rod lower end tap (lower end position) and the foreign matter filter may be constant, the continuous protrusions 30 are provided in the wide range of the height of the inner strap 8. In the present invention, thin inner straps 8 are spaced apart from each other and arranged in parallel, and axially wide-ranged continuous protrusions 30 are provided on the front and back sides at the strap intersection. The two thin inner straps 8 are spaced apart from each other and arranged in parallel in order to provide axially wide-ranged continuous protrusions 30 on the front and back sides in the vicinity of the strap intersection. Further, the ease with which foreign matter is trapped at positions other than around the fuel rod 5 is also taken into consideration. Further, it is also possible, as shown in FIG. 12, to provide a cutout 31 in the strap lower surface where there is no protrusion 30 at the strap intersection, making it easier for foreign matter to get into the intersection region. Regarding the foreign matter entering the strap intersection region, a vane type protrusion 32 is also provided so that even small foreign matter may be trapped (FIG. 12A). In the foreign matter filter in which the space region of the strap intersection is set to be large so that foreign matter can easily get into a region other than around the fuel rod, it is possible to provide no vane type protrusion 32 as shown in FIG. 12A, and arrange this foreign matter filter 29 directly below the lower grid, dividing the large space region into two by the strap 33 of the lower grid so that even small foreign matter can be trapped (FIG. 12B).

The configuration of the protrusions is determined taking into account the moldability of the straps and the regular flow of the cooling water. That is, the protrusions 30 are of a wide configuration extending over two cells. Further, a regular configuration is adopted for the protrusions at each lattice (cell). As described above, in the foreign matter filter of the present invention, which is formed by straps having axially continuous protrusions in order to enhance the foreign matter trapping performance over the entire service life of the fuel assembly, it is possible to make the maximum gap between the straps of the foreign matter filter and the lower end tap smaller than the grid portion (approximately ½) even in the case of a design in which the fuel rod lower end taps are shortened, whereby it is possible to minimize intrusion into the fuel effective portion of such foreign matter fragments as will lead to fuel leakage.

The construction of the foreign matter filter of the present invention is such that a foreign matter trapping effect can be expected even in the case of a design in which the fuel rod lower end taps are shortened.

Embodiment 8

FIGS. 13A through 13D show foreign matter capturing upper and lower nozzles according to Embodiment 8, showing a construction preventing, over the entire service life of the fuel assembly, foreign matter fragments from flowing into the fuel effective portion.

To achieve the above object, the present invention adopts the following means for preventing, over the entire service life of the fuel assembly, such foreign matter fragments as will lead to fuel leakage from entering the flow passage holes of the DFBN and flowing into the fuel effective portion.

Figure 13A:
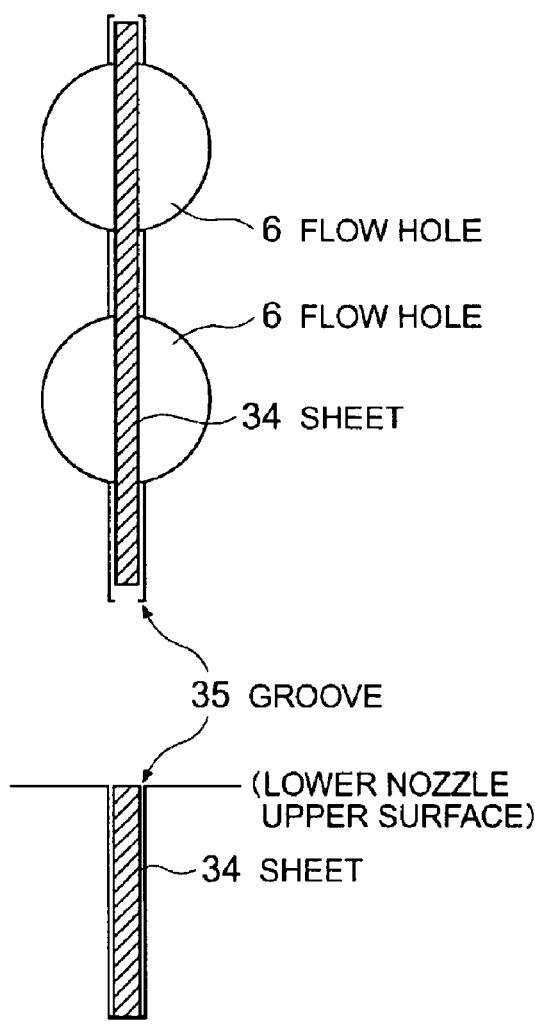
FIGS. 13A, 13B, 13C, and 13D are diagrams showing foreign matter capturing upper and lower nozzles according to Embodiment 8.
Figure 13B:
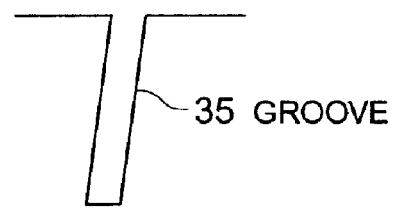
Figure 13C:
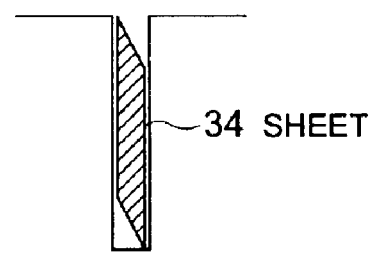
Figure 13D:
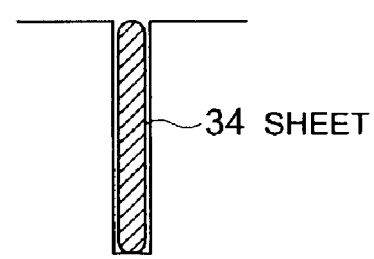

To reduce the size of the foreign matter fragments passing through flow holes 6 of the lower nozzle 2, a groove 35 is formed on the line near the centers of the flow holes 6 (the upper surface of the lower nozzle), and a thin sheet 34 is fitted into the groove 35; FIG. 13A shows the construction of an enhanced foreign matter capturing lower nozzle in which the sheet 34 is fixed by welding or the like to the upper surface or lower surface of the lower nozzle. Regarding the length of the sheet, using a single sheet extending over the entire width of the lower nozzle with respect to each groove line would be advantageous in terms of production cost; it is also possible to divide the sheet according to the positional relationship with the guide thimbles, etc. (interface) and fit the divisional sheet portions into the groove in the upper surface of the lower nozzle. To further reduce the size of the foreign matter passing through the flow holes 6, it is possible to form the groove 35 obliquely and fit the sheet obliquely therein (FIG. 13B). From the viewpoint of reducing the pressure loss, the sheet thickness can be made as small as possible. Further, the upper and lower sheet surfaces may have a tapered or rounded configuration (FIGS. 13C and 13D). The tapered and rounded configurations are not restricted to the ones shown. The tapered configuration can be realized by grinding or crushing. The rounded configuration can be realized, for example, by melting the end surface by laser irradiation and utilizing surface tension.

Embodiment 9

Figure 14:
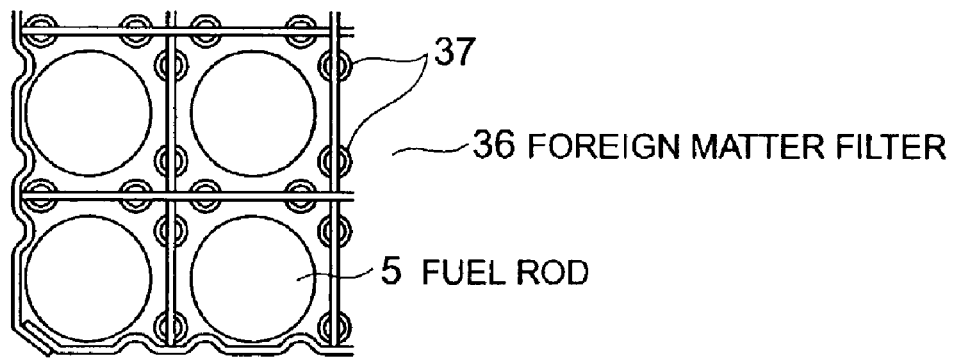
FIG. 14 is a diagram showing a foreign matter filter according to Embodiment 9.
Figure 14:
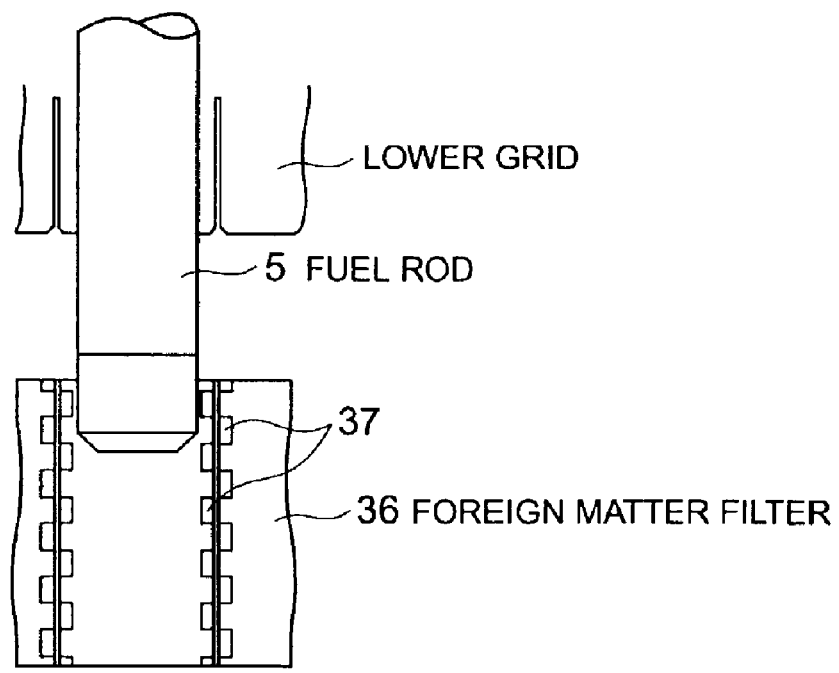
Figure 14:
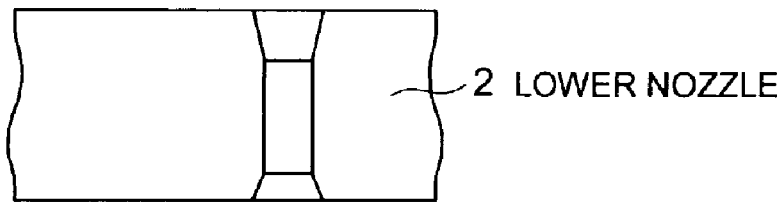
Figure 15:
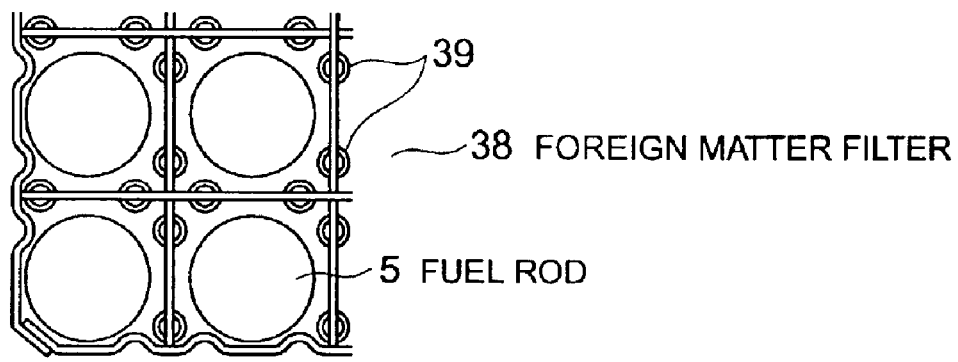
FIG. 15 is a diagram showing a foreign matter filter according to Embodiment 9.
Figure 15:
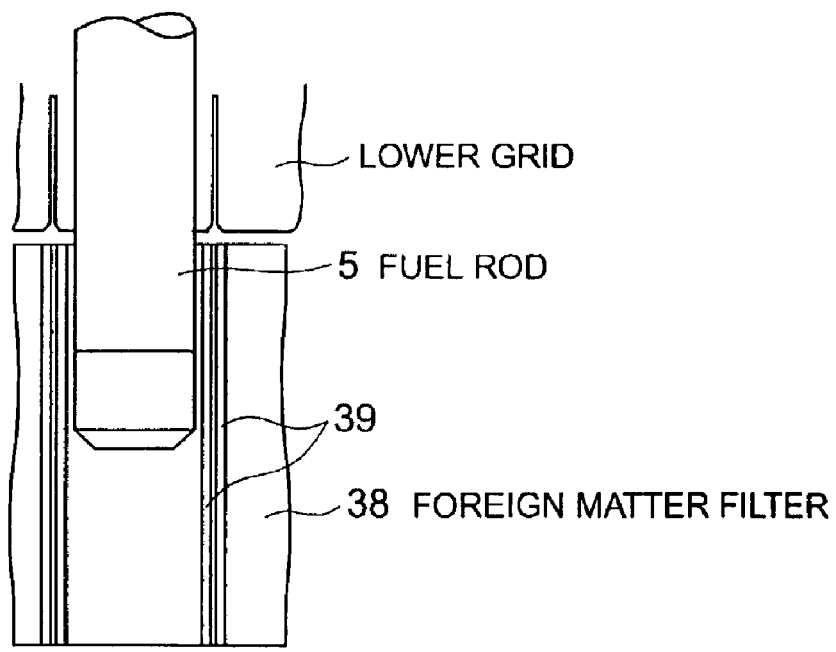
Figure 15:
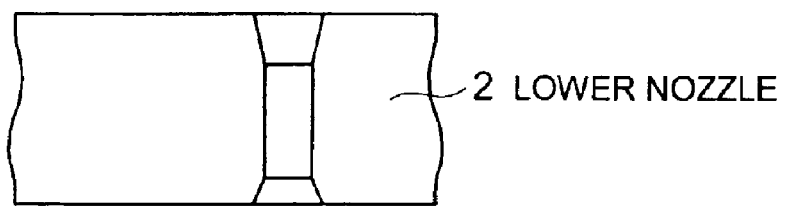
Figure 16:
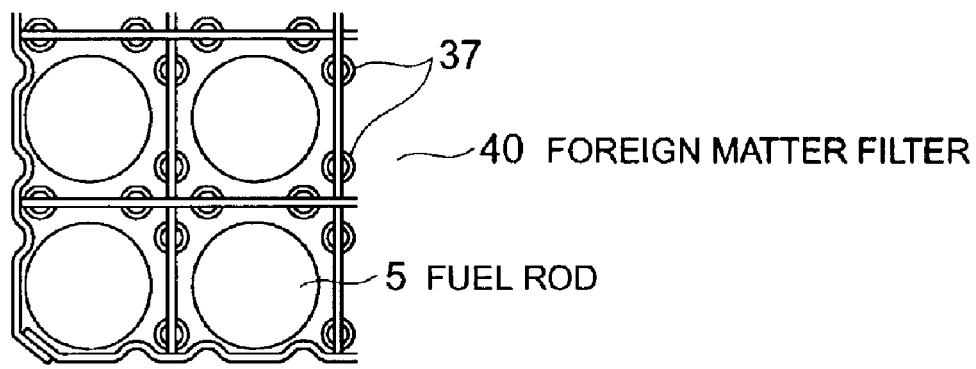
FIG. 16 is a diagram showing a foreign matter filter according to Embodiment 9.
Figure 16:
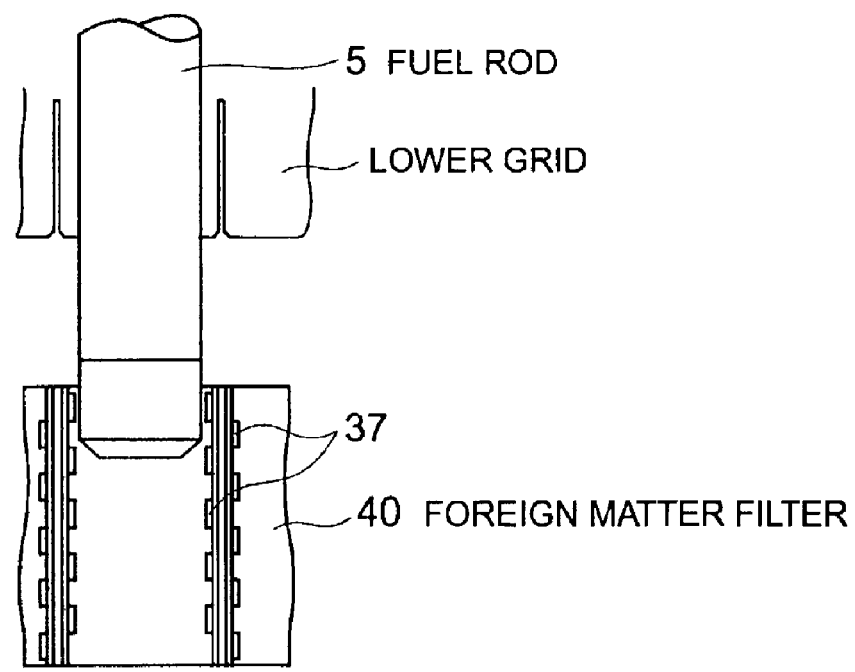
Figure 16:
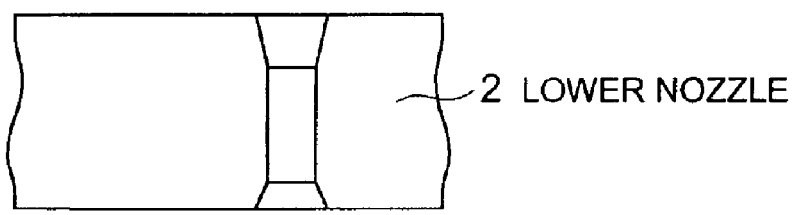

FIGS. 14 through 16 show a foreign matter filter according to Embodiment 9. By installing this foreign matter filter between the DFBN and the lower grid, foreign matter fragments are prevented from flowing into the fuel effective portion (covering tube portion) over the entire service life of the fuel assembly.

To achieve the above object, the present invention adopts the following means for preventing, over the entire service life of the fuel assembly, such foreign matter fragments with adverse effect mixed in the coolant (as will lead to fuel leakage) from entering the flow passage holes of the DFBN and flowing into the fuel effective portion.

Between the DFBN and the lower grid, there is installed a foreign matter filter 36 according to the present invention which has lattice spaces and is formed by straps. As shown in FIG. 14, this foreign matter filter 36 is formed by composite straps each consisting of two straps superimposed one upon the other and alternately having embossed dimples 37, the composite straps being assembled into a lattice; the number and pitch of lattice spaces are approximately the same as those of the conventional lower grid, and the outer size is somewhat smaller than that of the DFBN and the lower grid. In this construction, embossed dimples 37 are alternately provided in the axial direction of each strap, and two straps are superimposed one upon the other, whereby the inter-dimple distance can be made small, and the foreign matter capturing effect is enhanced. In the foreign matter filter 38 of FIG. 15, the embossed dimples of FIG. 14 are provided not as alternate dimples but as axially continuous straight dimples 39; further, to prevent as much as possible passing of foreign matter due to the gap between the lower grid and the foreign matter filter, the strap width of the foreign matter filter is increased. This structure, in which the strap width is increased, is applicable not only to this embodiment but, in some cases, also to the other embodiments described below. The number and pitch of lattice spaces are approximately the same as those of the conventional lower grid, and the outer size is somewhat smaller than that of the DFBN and the lower grid. In this construction, straight portions where dimples 39 extend continuously are provided in the axial direction of the straps, and two straps are superimposed one upon the other, whereby the inter-dimple distance can be diminished, and the foreign matter capturing effect is enhanced. Next, like the foreign matter filter of FIG. 14, the foreign matter filter 40 of FIG. 16 is formed by assembling composite straps into a lattice, each composite straps being formed by superimposing two straps one upon the other and having alternate continuous embossed dimples 37; in this case, when superimposing the two straps one upon the other, a gap (approximately 1 to 2 mm) is provided. The number and pitch of lattice spaces are approximately the same as those of the conventional lower grid, and the outer size is somewhat smaller than that of the DFBN and the lower grid. In the foreign matter filter of FIG. 16 of the present invention, which is formed by composite straps each consisting of two straps spaced apart from each other, it is possible to make the maximum gap between the straps of the foreign matter filter and the lower end taps smaller than the grid portion even in the case of a design in which the fuel rod lower end taps are shortened, whereby the foreign matter trapping performance is enhanced over the entire service life of the fuel assembly.

By installing the foreign matter filters of the present invention shown in FIGS. 14 through 16, it is possible to capture foreign matter fragments constituting a problem in the prior art, and its foreign matter prevention effect can be expected over the entire service life of the fuel assembly.

Embodiment 10

FIGS. 17 through 21 show foreign matter filters according to Embodiment 10; by installing these foreign matter filters between the DFBN and the lower grid, foreign matter fragments are prevented from flowing into the fuel effective portion (covering tube portion) over the entire service life of the fuel assembly.

To achieve the above object, the present invention adopts the following means for preventing, over the entire service life of the fuel assembly, such foreign matter fragments with adverse effect mixed in the coolant (as will lead to fuel leakage) from entering the flow passage holes of the DFBN and flowing into the fuel effective portion.

Figure 17:
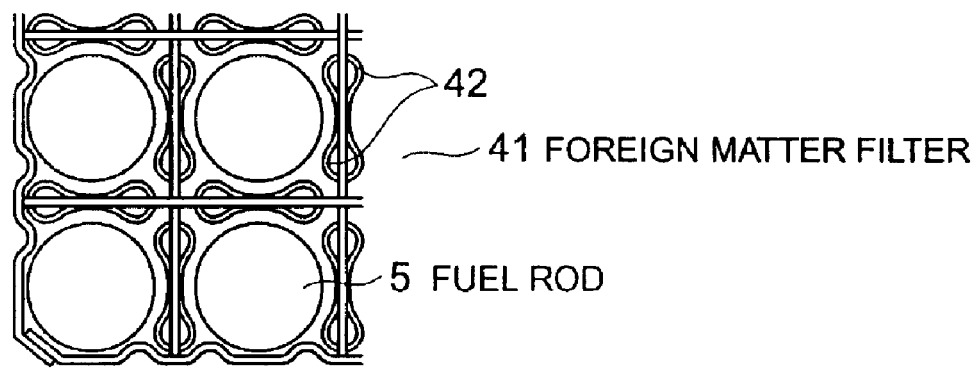
FIG. 17 is a diagram showing a foreign matter filter according to Embodiment 10.
Figure 17:
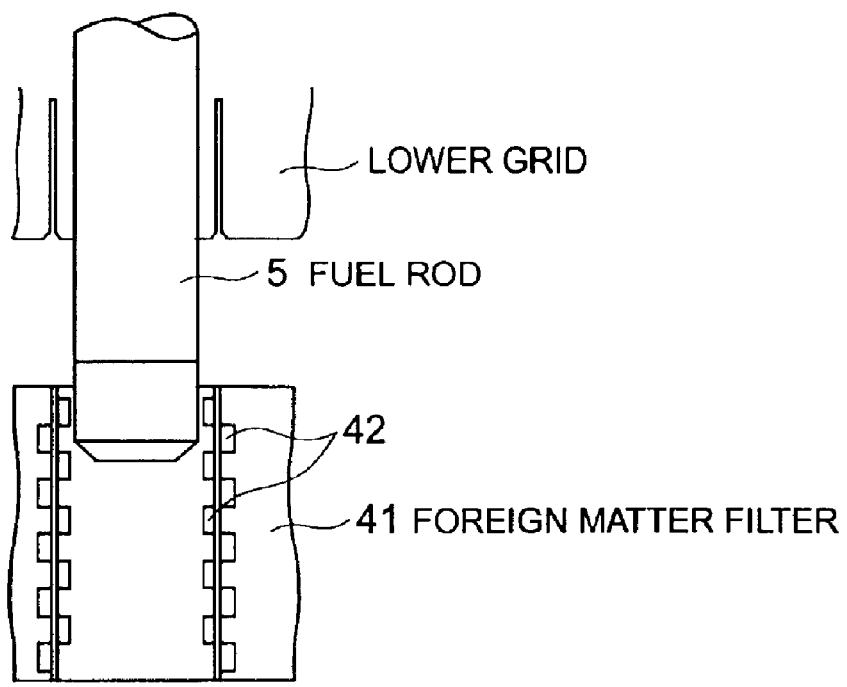
Figure 17:
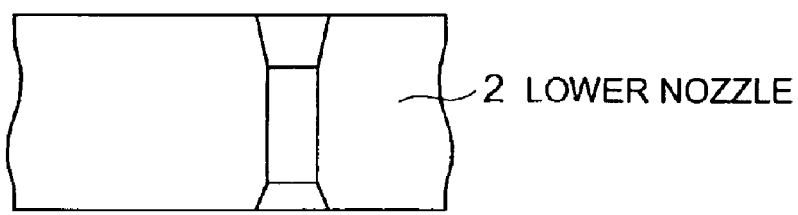

Between the DFBN and the lower grid, there is installed a foreign matter filter 41 according to the present invention which is formed by straps. As shown in FIG. 17, this foreign matter filter 41 is formed by assembling composite straps into a lattice, and each composite strap is formed by superimposing one upon the other two straps each having alternate embossed dimples 42, the dimples being formed such that they are in contact with the inner sides of the cells and rounded; the number and pitch of lattice spaces are approximately the same as those of the conventional lower grid, and the outer size is somewhat smaller than that of the DFBN and the lower grid. In this construction, embossed round dimples 42 are alternately provided in the axial direction of the straps, and two straps are superimposed one upon the other, whereby the inter-dimple distance can be diminished, and the tendency of enhancing the foreign matter capturing effect is observed. In the foreign matter filter 43 of FIG. 18, the rounded dimples of FIG. 17 are provided not alternately but as axially continuous straight rounded dimples 44; the number and pitch of lattice spaces are approximately the same as those of the conventional lower grid, and the outer size is somewhat smaller than that of the DFBN and the lower grid.

In this construction, there are provided straight portions where embossed rounded dimples 44 extend continuously are provided in the axial direction of the straps, and two straps are superimposed one upon the other, whereby the inter-dimple distance can be diminished and the tendency of enhancing the foreign matter capturing effect is observed.

Figure 18:
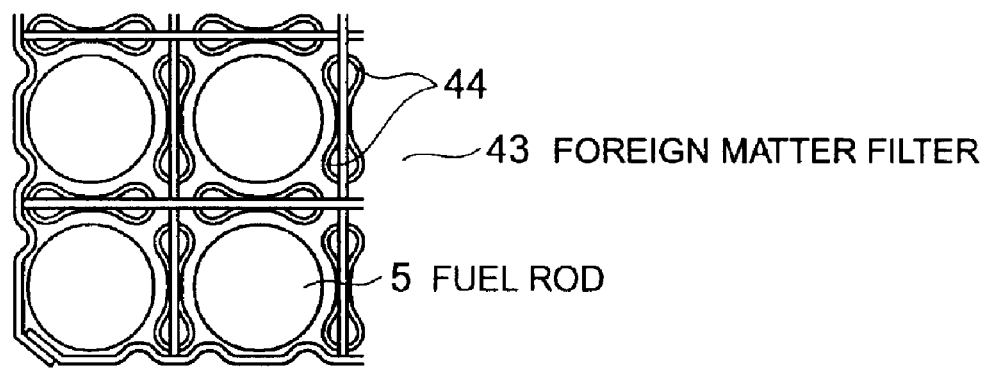
FIG. 18 is a diagram showing a foreign matter filter according to Embodiment 10.
Figure 18:
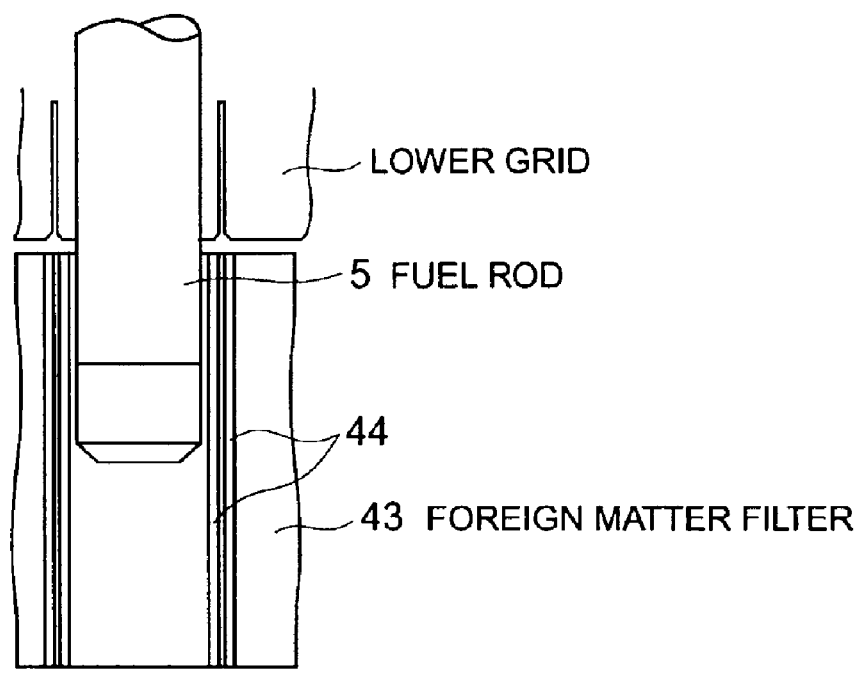
Figure 18:
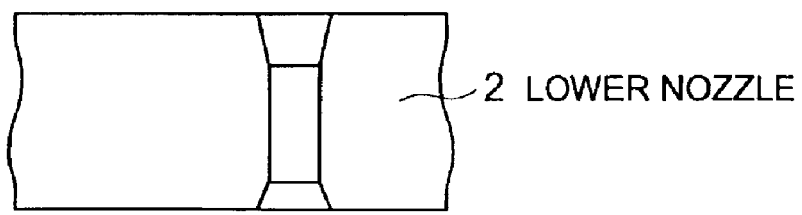
Figure 19:
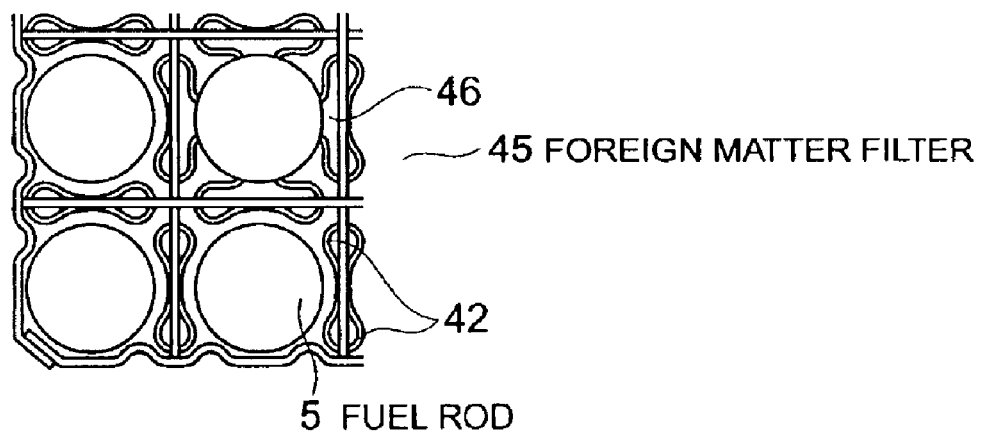
FIG. 19 is a diagram showing a foreign matter filter according to Embodiment 10.
Figure 19:
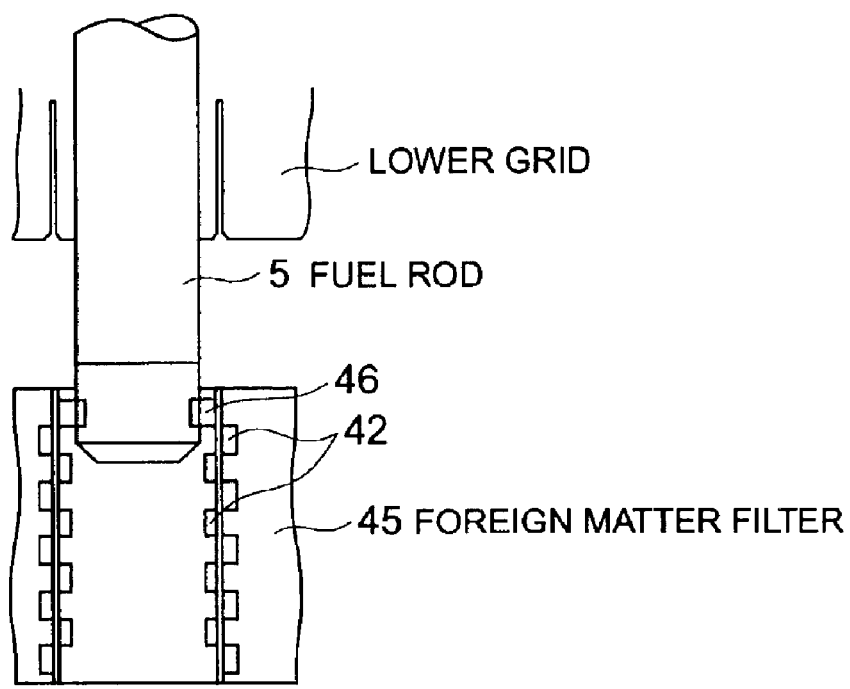
Figure 19:
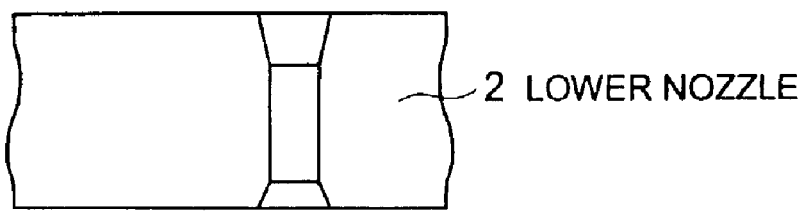
Figure 20:
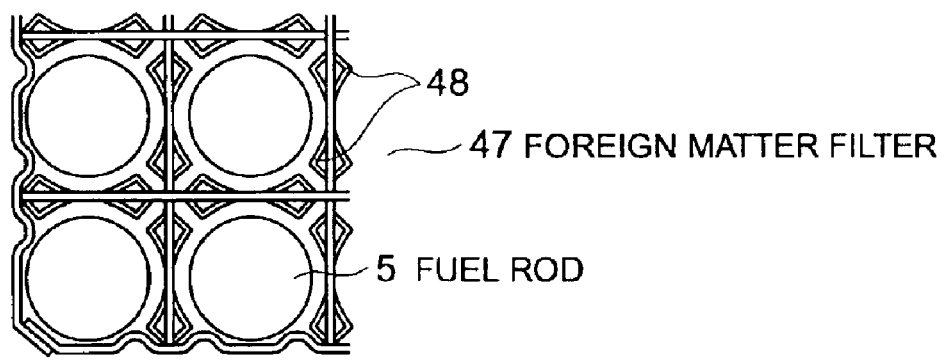
FIG. 20 is a diagram showing a foreign matter filter according to Embodiment 10.
Figure 20:
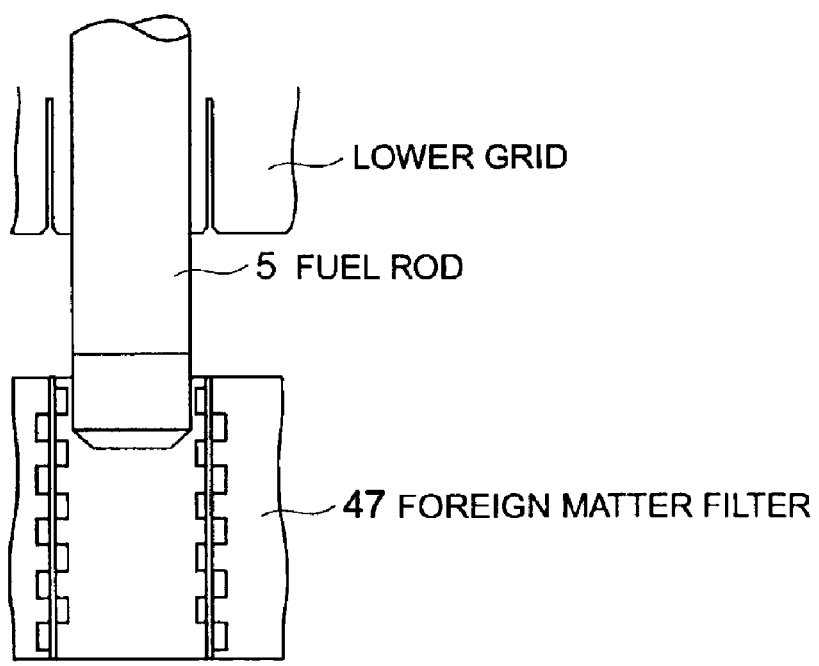
Figure 20:
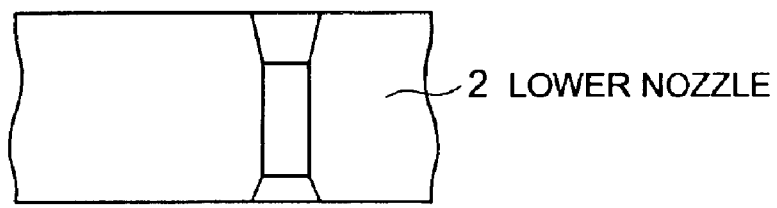
Figure 21:
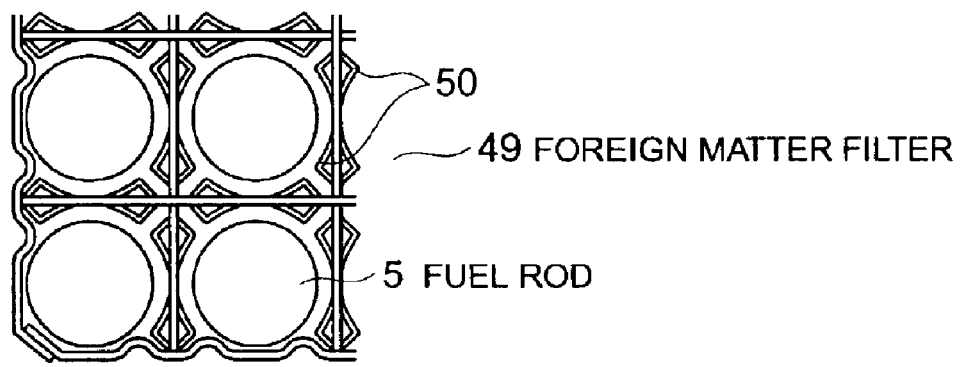
FIG. 21 is a diagram showing a foreign matter filter according to Embodiment 10.
Figure 21:
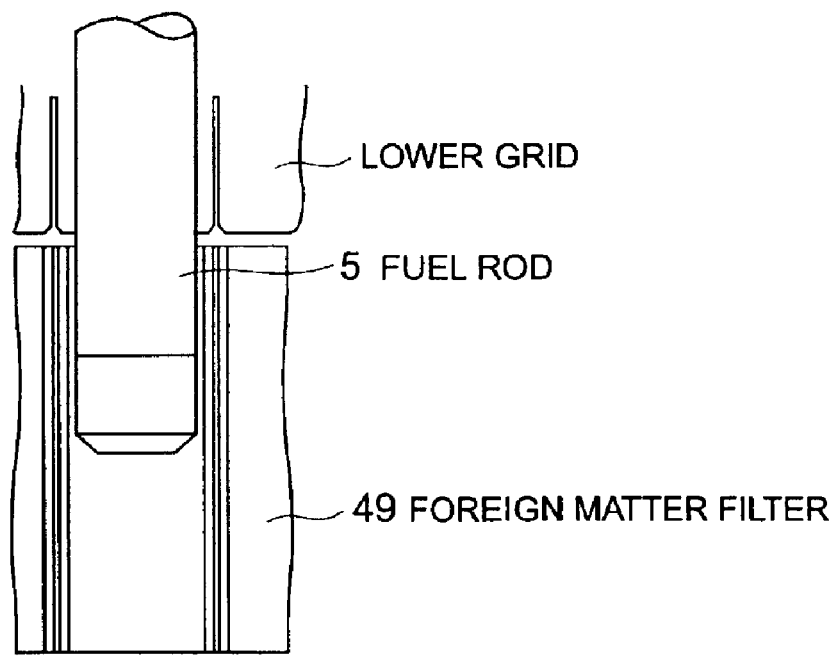
Figure 21:
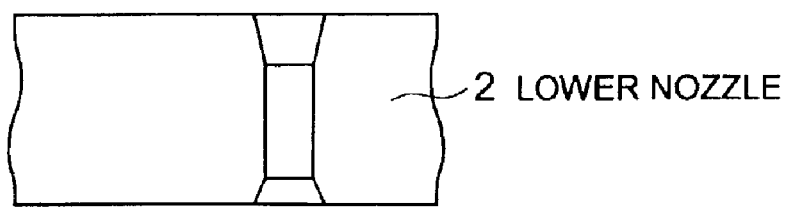

Next, like the foreign matter filter of FIG. 17, the foreign matter filter 45 of FIG. 19 is formed by assembling composite straps into a lattice, each composite strap being formed by superimposing two straps, each having alternate embossed dimples 42, one upon the other, and the dimples being formed such that they are in contact with the inner sides of the cells and rounded. This filter differs from that of FIG. 17 in that grooved fuel rod lower end taps are engaged with the dimples 46 of arbitrarily selected several cells for fixation. The number and pitch of lattice spaces are approximately the same as those of the conventional lower grid, and the outer size is somewhat smaller than that of the DFBN and the lower grid. Next, FIG. 20 shows a foreign matter filter 47 which is formed, like the foreign matter filter of FIG. 18, by assembling composite straps into a lattice, each composite strap consisting of two straps superimposed one upon the other and having alternate embossed rounded dimples in contact with the inner sides of the cells. In this case, the corner portions of the rounded dimples held in contact with the inner sides are cut straight to an angle of 45 degrees as indicated at 48. The number and pitch of lattice spaces are approximately the same as those of the conventional lower grid, and the outer size is somewhat smaller than that of the DFBN and the lower grid. FIG. 21 shows a foreign matter filter 49 in which the rounded dimples of FIG. 20 cut straight to an angle of 45 degrees are formed not alternately but as straight dimples 50 extending continuously in the axial direction; the number and pitches of lattice spaces are approximately the same as those of the conventional lower grid, and the outer size is somewhat smaller than that of the DFBN and the grid.

By providing the foreign matter filters of the present invention shown in FIGS. 17 through 21, it is possible to capture small foreign matter fragments constituting a problem in the prior art and a foreign matter prevention effect can be expected over the entire service life of the fuel assembly.

Embodiment 11

Figure 22:
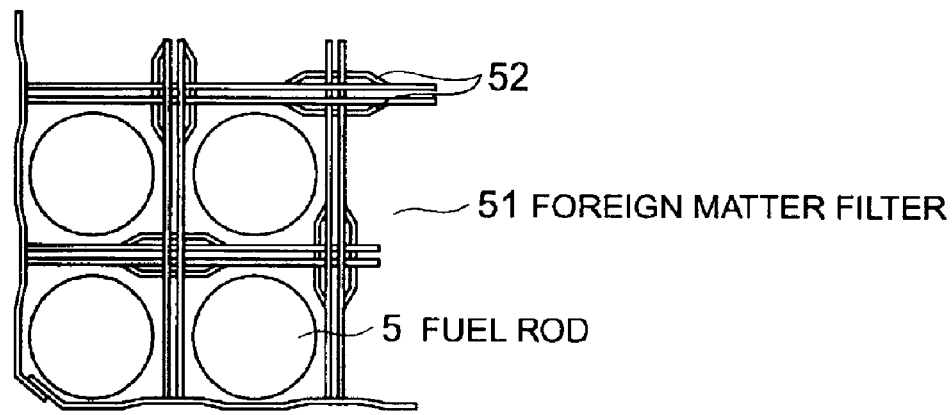
FIG. 22 is a diagram showing a foreign matter filter according to Embodiment 11.
Figure 22:
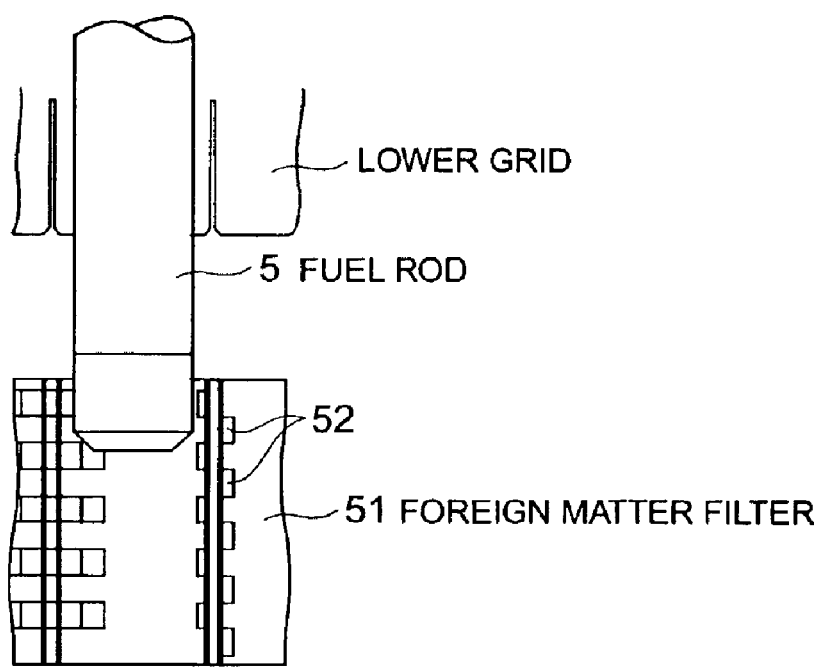
Figure 22:
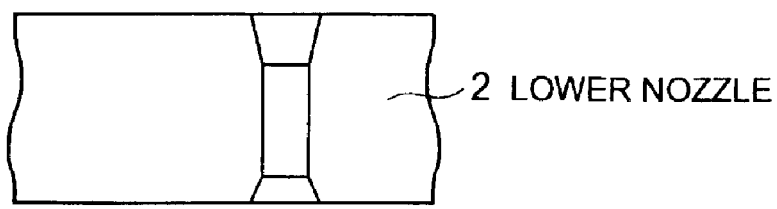

FIG. 22 shows a foreign matter filter according to Embodiment 11; by providing this foreign matter filter between the DFBN and the lower grid, foreign matter fragments are prevented from flowing into the fuel effective portion (covering tube portion) over the entire service life of the fuel assembly.

To achieve the above object, the present invention adopts the following means for preventing, over the entire service life of the fuel assembly, such foreign matter fragments with adverse effect mixed in the coolant (as will lead to fuel leakage) from entering the flow passage holes of the DFBN and flowing into the fuel effective portion.

Between the DFBN and the lower grid, there is installed a foreign matter filter 51 according to the present invention which is formed by straps. As shown in FIG. 22, this foreign matter filter 51 is formed by composite straps each consisting of two straps superimposed one upon the other and having protrusions 52 extending over the entire height of the straps in two directions. Taking into account the strap moldability and the regular flow of the cooling water, the straps are arranged in 2-cell pitch and equipped with protrusions, which have flat surfaces and a large width. Further, in the present invention, it is possible to make the maximum gap between the straps of the foreign filter and the lower end taps smaller than the grid portion even in the case of a design in which the fuel rod lower end taps are shortened. In order to enhance the foreign matter trapping performance over the entire service life of the fuel assembly, a gap of approximately 1 to 2 mm is provided when superimposing the straps one upon the other. The number and pitch of lattice spaces are approximately the same as those of the conventional lower grid, and the outer size is somewhat smaller than that of the DFBN and the lower grid.

By installing the foreign matter filter of the present invention shown in FIG. 22, it is possible to capture foreign matter fragments constituting a problem in the prior art, and the foreign matter prevention effect can be expected over the entire service life of the fuel assembly.

Embodiment 12

Figure 23:
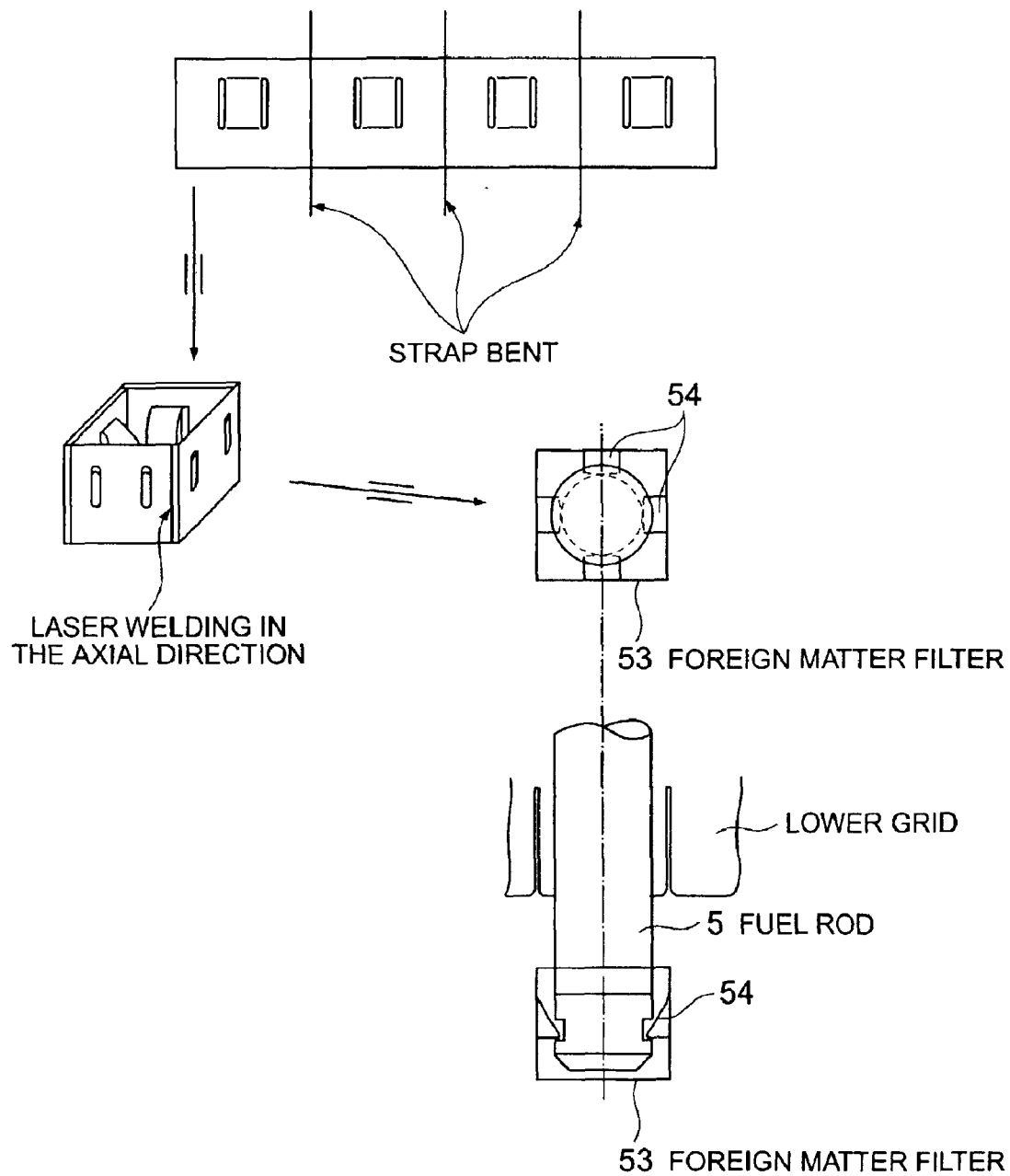
FIG. 23 is a diagram showing a foreign matter filter according to Embodiment 12.

FIG. 23 shows a foreign matter filter according to Embodiment 12. By installing this foreign matter filter between the DFBN and the lower grid, foreign matter fragments are prevented from flowing into the fuel effective portion (covering tube portion) over the entire service life of the fuel assembly.

To achieve the above object, the present invention adopts the following means for preventing, over the entire service life of the fuel assembly, such foreign matter fragments with adverse effect mixed in the coolant (as will lead to fuel leakage) from entering the flow passage holes of the DFBN and flowing into the fuel effective portion. Between the DFBN and the lower grid, there is installed a foreign matter filter 53 according to the present invention which has single-unit lattice spaces respectively constituting the cells formed by straps. As shown in FIG. 23, this foreign matter filter 53 is formed by straps characterized in that spring-like protrusions 54 are provided in the axial direction, the single-unit lattice spaces respectively constituting the cells being formed into one cell assembly by laser welding. The cell assembly is mounted for each cell to the lower end taps of the fuel rods of the fuel assembly; thus, peripheral grooves are formed in the fuel rod end taps beforehand, and the axial spring-like protrusions 54 of the present invention are engaged with the grooves for fixation. As a method of mounting the foreign matter filter of the present invention to the grooved fuel rod lower end taps, there is exemplified a method in which the foreign matter filter cell assemblies (in the same number as the fuel rods) are accommodated in a box type holder of the lattice space pitch (with separate chambers), and are simultaneously forced into all the fuel rod lower end taps from the lower side of the fuel assembly. In the foreign matter filter of the present invention mounted to the grooved fuel rod lower end taps, the return portions of the spring-like protrusions are straight, so that there is no fear of detachment.

By installing the foreign matter filter of the present invention shown in FIG. 23, it is possible to capture foreign matter fragments constituting a problem in the prior art, and its foreign matter prevention effect can be expected over the entire service life of the fuel assembly.

Embodiment 13

FIG. 24 shows the construction of outer straps 60 of a foreign matter filter according to Embodiment 13. In the construction and combination pattern shown, these outer straps 60 are combined with the basic inner cell constructions of Embodiments 9 through 11, whereby such foreign matter fragments as will lead to fuel leakage in the outer periphery of the foreign matter filter are prevented from flowing into the fuel effective portion over the entire service life of the fuel assembly.

Figure 24A:
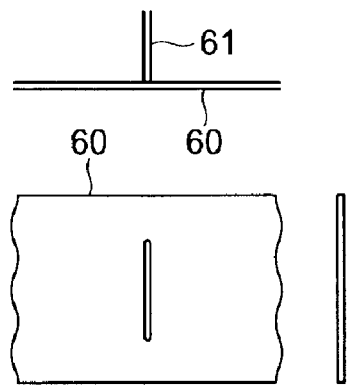
FIGS. 24A, 24B, 24C, 24D, 24E, and 24F are diagrams each showing the outer strap construction of a foreign matter filter according to Embodiment 13.

To achieve the above object also in the outer periphery of the foreign matter filter, and to prevent such foreign matter fragments in the coolant as will lead to fuel leakage from entering the flow passage holes of the DFBN and flowing into the fuel effective portion over the entire service life of the fuel assembly, the present invention adopts the following means. FIGS. 24A through 24F show outer strap constructions of the foreign matter filter. The outer size of the foreign matter filter is somewhat smaller than that of the DFBN and the lower grid. These construction types have the following features:

The outer strap 60 of FIG. 24A is generally of a flat configuration (with no protrusion formation).

Figure 24B:
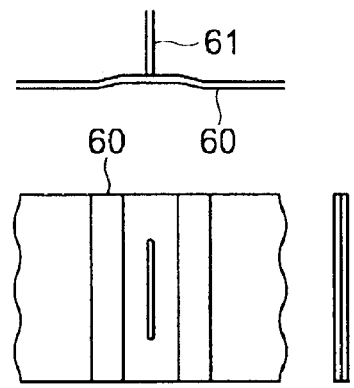

The outer strap construction shown in FIG. 24B has a protrusion in the portion where it is connected to the inner strap 61, and a flat portion is provided in consideration of moldability.

Figure 24C:
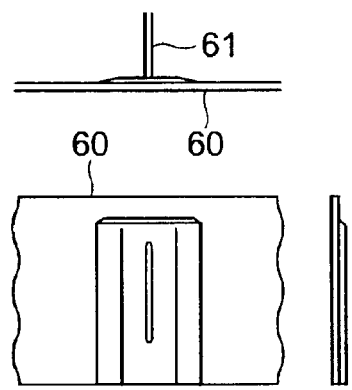

In the construction shown in FIG. 24C, the formation of the protrusions in the vicinity of the upper portion of FIG. 24B is eliminated to reduce the size of foreign matter passing between the adjacent fuels. (The protrusions are axially continuous.)

Figure 24D:
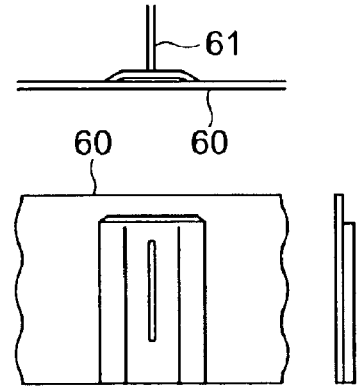

In FIG. 24D, the protrusions of FIG. 24C are axially separated.

Figure 24E:
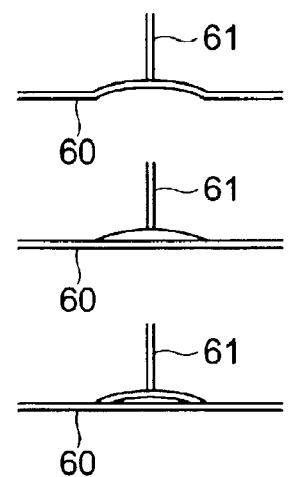

In FIG. 24E, the protrusions of FIGS. 24B through 24D are rounded.

Figure 24F:
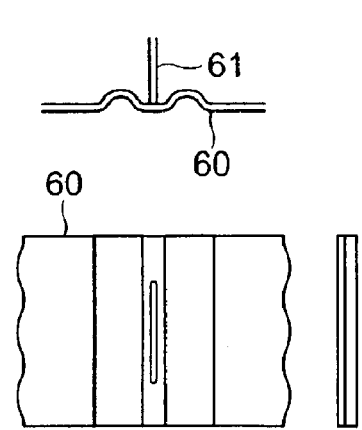
Figure 25:
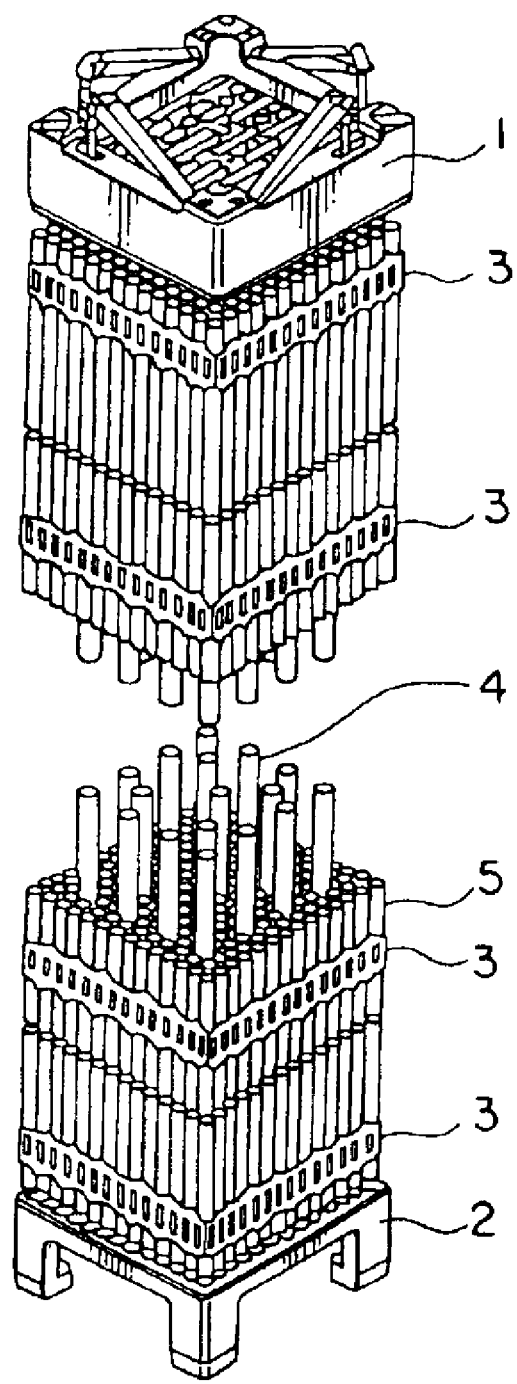
FIG. 25 is a single view drawing showing a fuel assembly.
Figure 26:
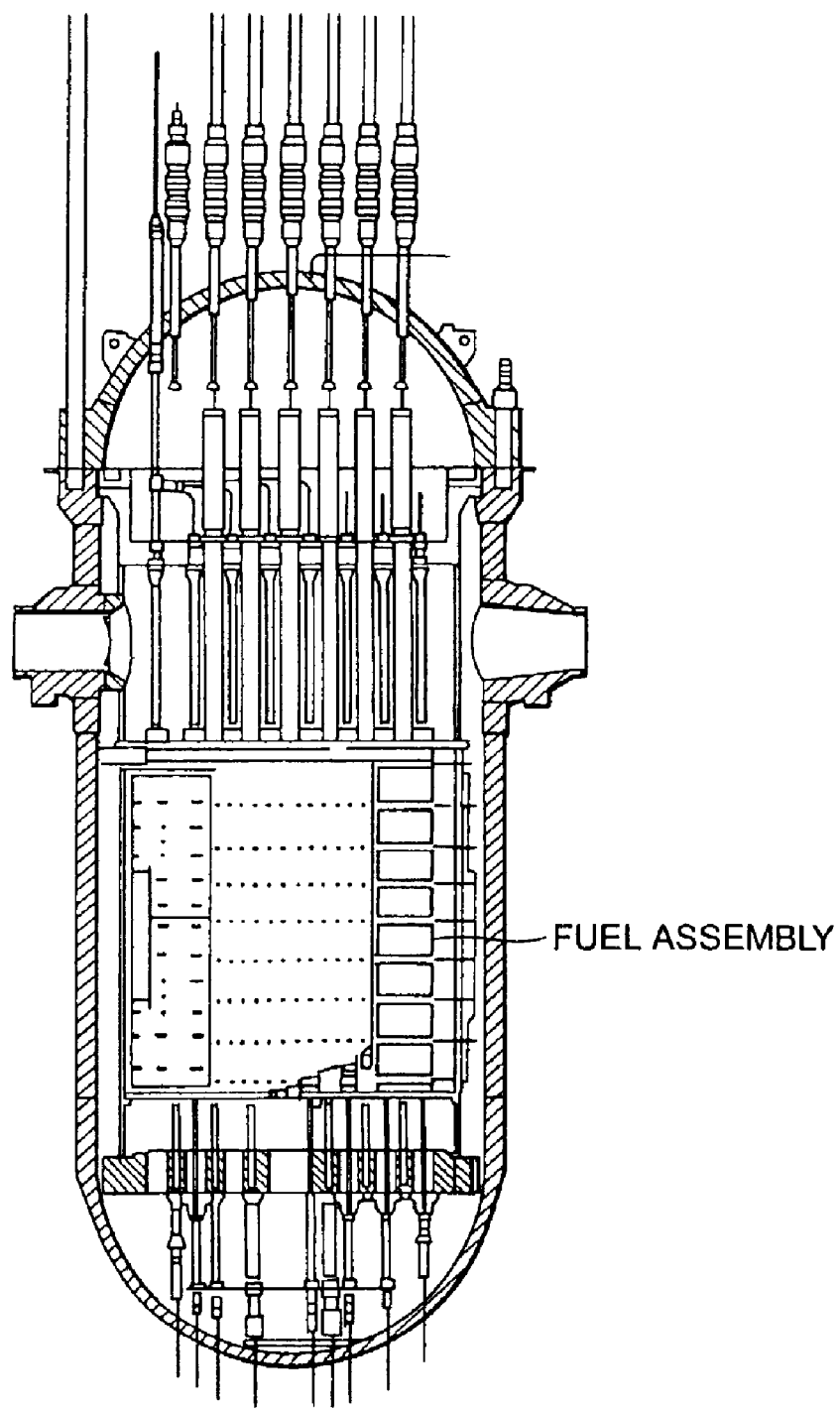
FIG. 26 is a sectional view showing a typical nuclear reactor.
Figure 27A:
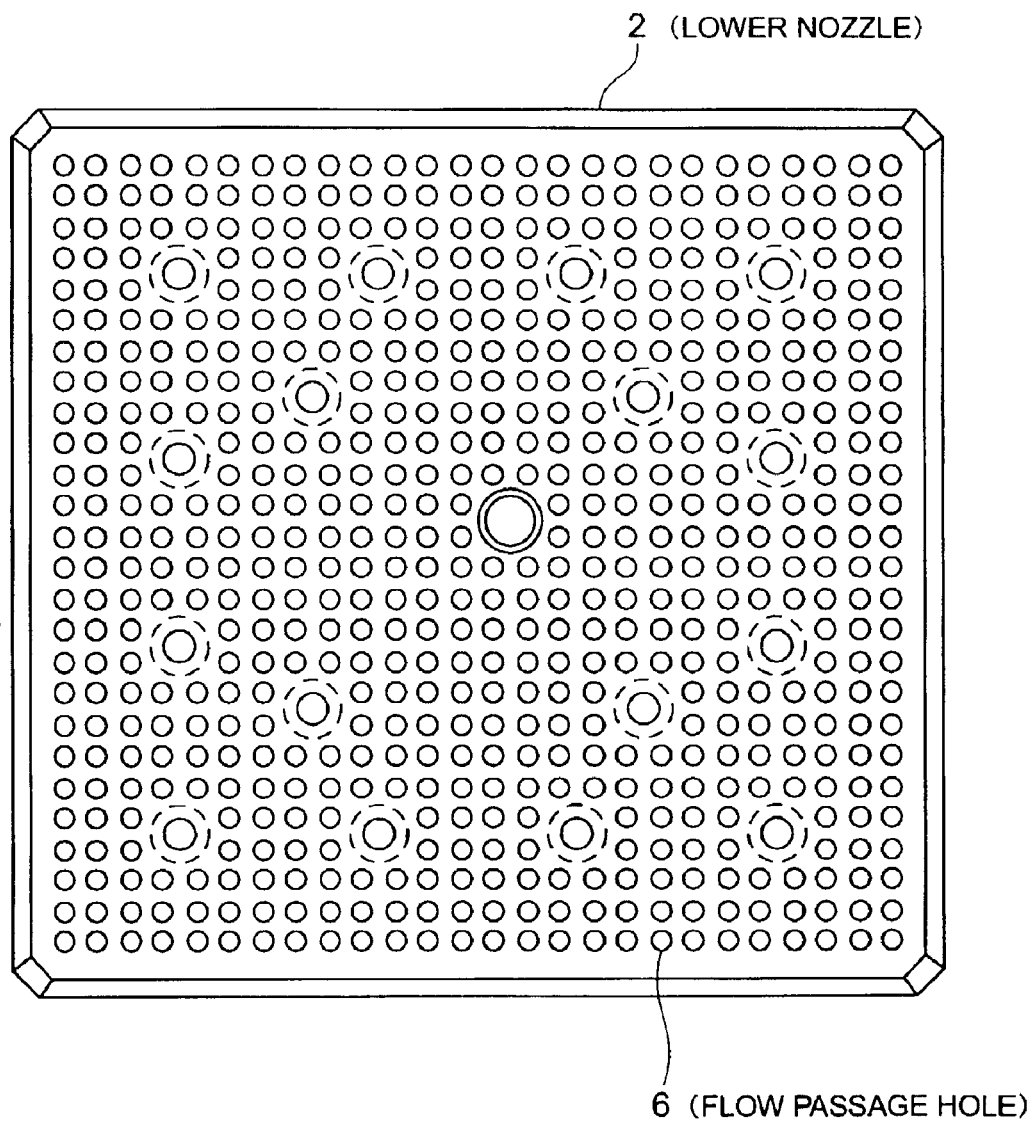
FIGS. 27A and 27B are plan views showing a lower nozzle.
Figure 27B:
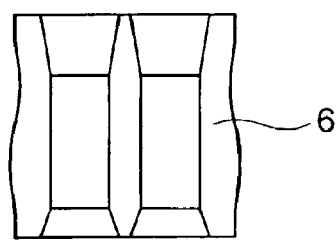

In FIG. 24F, protrusions are provided in the vicinity of the position where the outer strap is connected to the inner strap 61.

The following are patterns in which these outer straps 60 are combined with the basic inner cell constructions of Embodiments 9 through 11.

|  |  | Outer strap structure | | | | | |
|---|---|---|---|---|---|---|---|
|  |  | FIG. 24A | FIG. 24B | FIG. 24C | FIG. 24D | FIG. 24E | FIG. 24F |
| Basic inner cell structure | FIG. 14 | ○ | ○ | ○ | ○ | ○ | ○ |
|  | FIG. 15 | ○ | — | — | — | — | — |
|  | FIG. 16 | ○ | — | — | — | — | — |
|  | FIG. 17 | ○ | ○ | ○ | ○ | ○ | — |
|  | FIG. 18 | ○ | ○* | ○* | ○* | ○* | ○* |
|  | FIG. 19 | ○ | ○* | ○* | ○* | ○* | ○ |
|  | FIG. 20 | ○ | ○* | ○* | ○* | ○* | ○ |
|  | FIG. 21 | ○ | ○* | ○* | ○* | ○* | ○ |
|  | FIG. 22 | ○ | ○* | ○* | ○* | ○* | ○ |

In the structures with an asterisk, the protrusions at both ends of the inner strap 61 may be eliminated.

In the foreign matter filters of the present invention formed through the above combinations, it is possible to make the maximum gap between the outer straps 60 of the foreign filter and the lower end taps smaller than the lower grid portion even in the case of the design in which the fuel rod lower end taps are shortened, whereby it is possible to prevent as much as possible intrusion into the fuel effective portion of such foreign matter fragments as will lead to fuel leakage.

By installing such a foreign matter filter, it is possible to expect a superior foreign matter prevention effect (foreign matter trapping property) to that in the prior art.

As described above, in the foreign matter filter of the present invention, it is possible to make the maximum gap between the straps of the foreign matter filter and the lower end taps smaller than the gap of the grid portion (approximately ½), and the continuous protrusions are provided over a wide range in the inner strap height direction so that the foreign matter trapping dimension defined by the fuel rod lower end taps (lower end position) and the foreign matter filter may be constant, whereby it is possible to prevent, over the entire service life of the fuel assembly, intrusion into the fuel effective portion (covering tube portion) of such foreign matter fragments with an adverse effect (as will lead to fuel leakage) even where measures are taken to meet higher burn-up of the fuel assembly by, for example, shortening the fuel rod lower end taps.

By adopting such a foreign matter filter strap configuration, a superior foreign matter prevention effect to that in the prior art (ability to trap smaller foreign matter and durability in foreign matter trapping property over the entire service life) can be expected. Such a foreign matter filter construction is also applicable to fuel rods with elongated lower end taps.

What is claimed is:

1. A foreign matter filter, wherein, to reduce the size of foreign matter passing through flow holes of a lower nozzle, grooves are formed along lines passing near centers of the flow holes and in the upper surface of the lower nozzle such that at least two of the flow holes are connected by one of the grooves, a thin sheet being fitted into the grooves for fixation.

2. A lower nozzle for use in a fuel assembly and for capturing foreign matter, comprising:

an upper surface configured to face a plurality of fuel rods;

a plurality of flow holes formed in the upper surface;

a groove formed in the upper surface and configured to connect at least two of the plurality of flow holes; and a sheet positioned within the groove such that the sheet traverses at least a portion of each of the at least two flow holes.

3. The lower nozzle of claim 2, wherein each of the flow holes is substantially circular in cross-section.

4. The lower nozzle of claim 2, wherein an entire length of the sheet substantially extends across an entire width of the upper surface.

5. The lower nozzle of claim 2, wherein the groove is configured to be perpendicular with respect to the upper surface.

6. The lower nozzle of claim 2, wherein the groove is configured to be oblique with respect to the upper surface.

7. The lower nozzle of claim 2, wherein the sheet includes at least one tapered edge.

8. The lower nozzle of claim 2, wherein the sheet includes at least one rounded surface.

9. The lower nozzle of claim 2, wherein the groove is configured to traverse center portions of the at least two flow holes.

* * * * *